US006305478B1

(12) United States Patent
Friggstad

(10) Patent No.: US 6,305,478 B1
(45) Date of Patent: Oct. 23, 2001

(54) HYDRAULIC CONTROLS FOR AGRICULTURAL IMPLEMENTS

(75) Inventor: Terrance A. Friggstad, Grasswood (CA)

(73) Assignee: Flexi-Coil Ltd., Saskatoon (CA)

( * ) Notice: Subject to any disclaimer, the term of this patent is extended or adjusted under 35 U.S.C. 154(b) by 0 days.

(21) Appl. No.: 09/437,864

(22) Filed: Nov. 10, 1999

Related U.S. Application Data
(60) Provisional application No. 60/108,025, filed on Nov. 12, 1998.

(51) Int. Cl.[7] .................................................. A01B 63/00
(52) U.S. Cl. .............................. 172/458; 172/668; 172/4
(58) Field of Search .......................... 172/776, 311, 172/458, 668, 464, 4, 452, 487

(56) References Cited

U.S. PATENT DOCUMENTS

| | | | |
|---|---|---|---|
| 3,583,284 | * | 6/1971 | Ryan ........................................ 91/189 |
| 3,700,041 | * | 10/1972 | Ryan ........................................ 172/316 |
| 4,324,296 | * | 4/1982 | Scenk et al. ............................ 172/311 |
| 4,630,526 | * | 12/1986 | Burk et al. .............................. 172/311 |
| 4,821,806 | * | 4/1989 | Winter ..................................... 172/4 |
| 4,915,014 | * | 4/1990 | Gilmore et al. ........................ 172/311 |
| 4,967,851 | * | 11/1990 | Barber ..................................... 172/311 |
| 5,042,589 | * | 8/1991 | Hundeby et al. ..................... 172/462 |
| 5,065,681 | * | 11/1991 | Hadley .................................... 172/464 |
| 6,000,315 | * | 12/1999 | Graham et al. ........................ 91/520 |
| 6,035,943 | * | 3/2000 | Gerein et al. .......................... 172/328 |
| 6,068,064 | * | 5/2000 | Bettin et al. ............................ 172/413 |

* cited by examiner

*Primary Examiner*—Robert E. Pezzuto
*Assistant Examiner*—Nathan Mammen
(74) *Attorney, Agent, or Firm*—Larry W. Miller; John William Stader

(57) ABSTRACT

An agricultural implement, having ground engaging tools mounted on subframes that are movable through hydraulic actuators between raised transport and lowered working positions, is provided with a hydraulic circuit in which the actuators are connected in parallel with one another within a grouping of the actuators. The positioning of the ground engaging tools into a lowered working position closes the hydraulic circuit for the group of actuators. The subframes are arranged to float over ground undulations to maintain a common working depth for the ground engaging tools. The vertical movement of any one of the actuators in the common group will force a displacement of a corresponding amount of hydraulic fluid, which will then be shared by all of the remaining actuators in the corresponding group. A depth averaging control for the ground engaging tools and a mechanical headland stop apparatus are also provided for the agricultural implement.

16 Claims, 23 Drawing Sheets

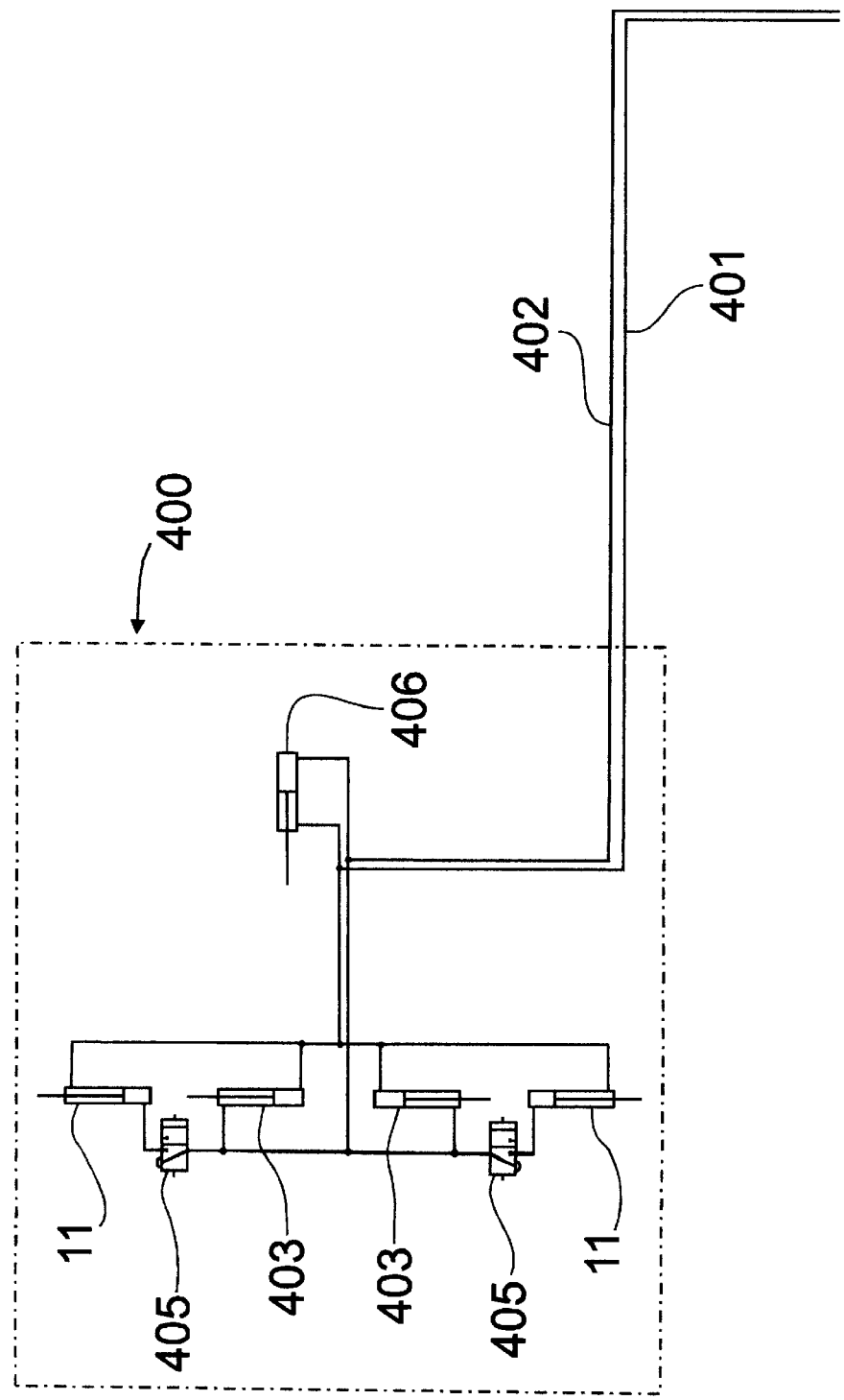

HYDRAULIC CONTROLS FOR AGRICULTURAL IMPLEMENTS

CROSS-REFERENCE TO RELATED APPLICATIONS

This application claims domestic priority on U.S. Provisional Patent Application Ser. No. 60/108,025, filed on Nov. 12, 1998, the contents of which are incorporated herein by reference.

BACKGROUND OF THE INVENTION

This invention relates generally to agricultural implements such as cultivators that have a framework for supporting ground engaging tools that can be used for a variety of farming operations including tilling soil, applying fertilizer, and seeding. Implements such as these can be effectively used in different farming practices such as conventional-till, low-till, or no-till methods. Such implements required a framework through which, during operation, draft forces are transmitted with a minimum of moment forces being generated, which otherwise force some ground engaging tools to work deeper while causing others to work more shallow than the desired set working depth.

It is also desirable and common for implements of this type to have hitch frames pivotally connected to the front of the implement for connection to a pulling, vehicle, providing up-down movement of the forward end of the hitch relative to the implement so the implement frame is better able to remain parallel to the ground being engaged. There have also been implements of these types which have a framework of wing sections that pivot relative to one another along axis aligned with a direction of travel so the individual sections are able to remain parallel to respective sectional regions of the ground being engaged.

Known tillage implements have wings or sections pivotal to each other on axis that are angled from a direction of travel, providing some accommodation for ground that varies in slope in which the pitch varies from the left to right side of the implement framework. Other implements show a framework which is loosely jointed such that it can twist to accommodate such variations in ground pitch.

These implements of the prior art have served well to provide good ground following a depth control for a variety of farming operations. But it is yet desirable to provide an implement that has excellent ground following characteristics, yet also is capable of very compact folding. As farms become larger, implements are transported greater distances between fields. Implements of larger widths are being used to perform farming operations in reduced time. It is desirable to provide an implement that is available in large widths, is easily configurable for transport on roadways in which the implement is folded compactly having small dimensions in width and height for transport.

SUMMARY OF THE INVENTION

It is an object of this invention to provide an implement with good ground following ability for consistent depth control across the whole implement, the implement being able to conform to variation in both ground pitch and roll.

It is also an object of this invention to provide an implement frame having such ground following characteristics which can be folded compactly for low and narrow transport.

It is also an object of this invention to provide an implement which is modular and capable of being configured when assembled for attachment of hoe or disc type ground engaging tools, and be used for either conventional-till, low-till, or no-till operations.

It is a further object of this invention to provide a framework through which biasing forces can be applied to transfer downward forces to distal ends of the framework.

These and other objects, features, and advantage are accomplished by the present invention by providing an agricultural implement, having ground engaging tools mounted on subframes that are movable through hydraulic actuators between raised transport and lowered working positions, with a hydraulic circuit in which the actuators are connected in parallel with one another within a grouping of the actuators. The positioning of the ground engaging tools into a lowered working position closes the hydraulic circuit for the group of actuators. The subframes are arranged to float over ground undulations to maintain a common working depth for the ground engaging tools. The vertical movement of any one of the actuators in the common group will force a displacement of a corresponding amount of hydraulic fluid, which will then be shared by all of the remaining actuators in the corresponding group. A depth averaging control for the ground engaging tools and a mechanical headland stop apparatus are also provided for the agricultural implement.

BRIEF DESCRIPTION OF DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
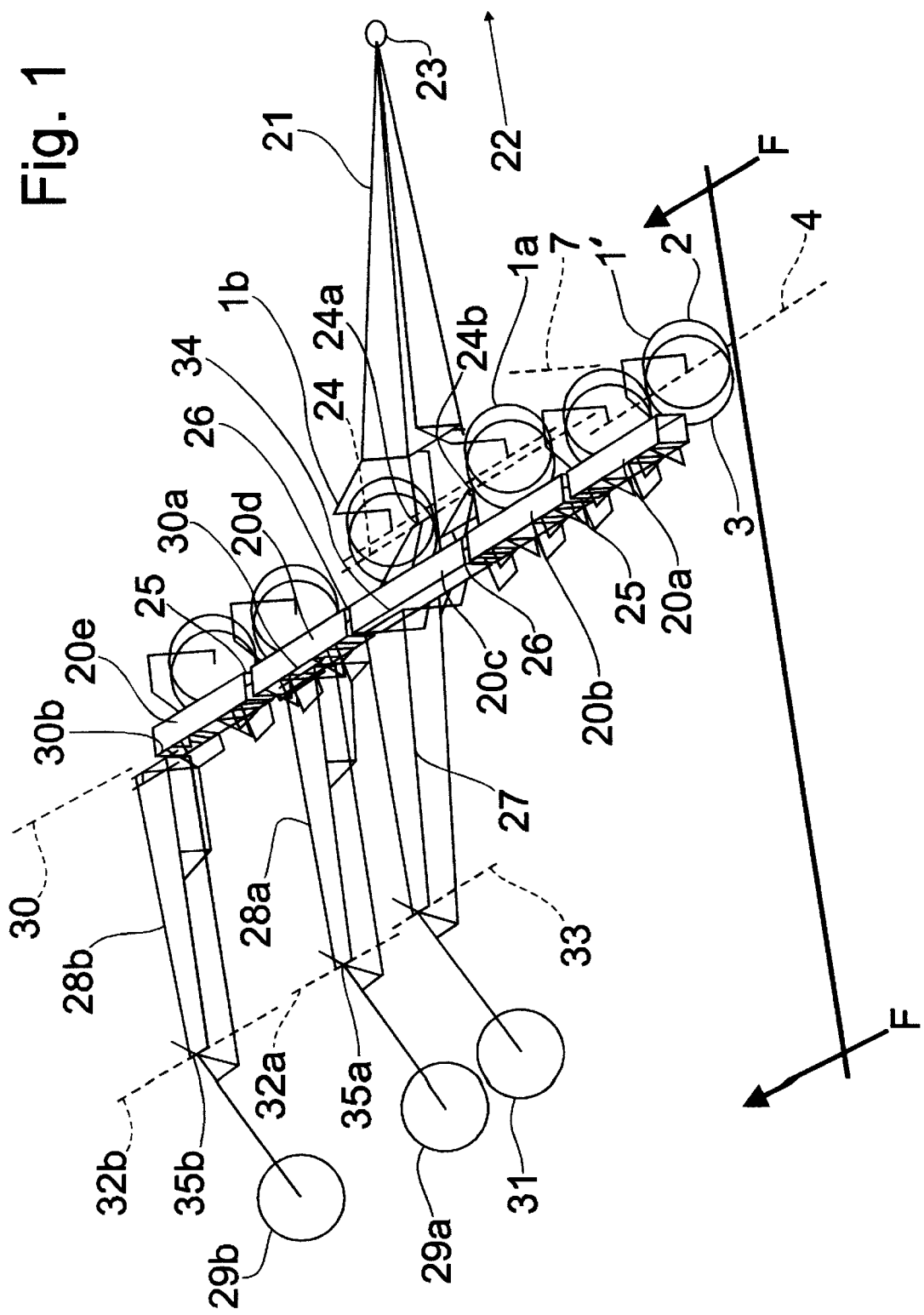
FIG. 1 is a perspective view of a schematic diagram of a modular implement having a 5 section drawbar with subframes attached to each section of the drawbar, and is shown in a field working position.
Figure 2:
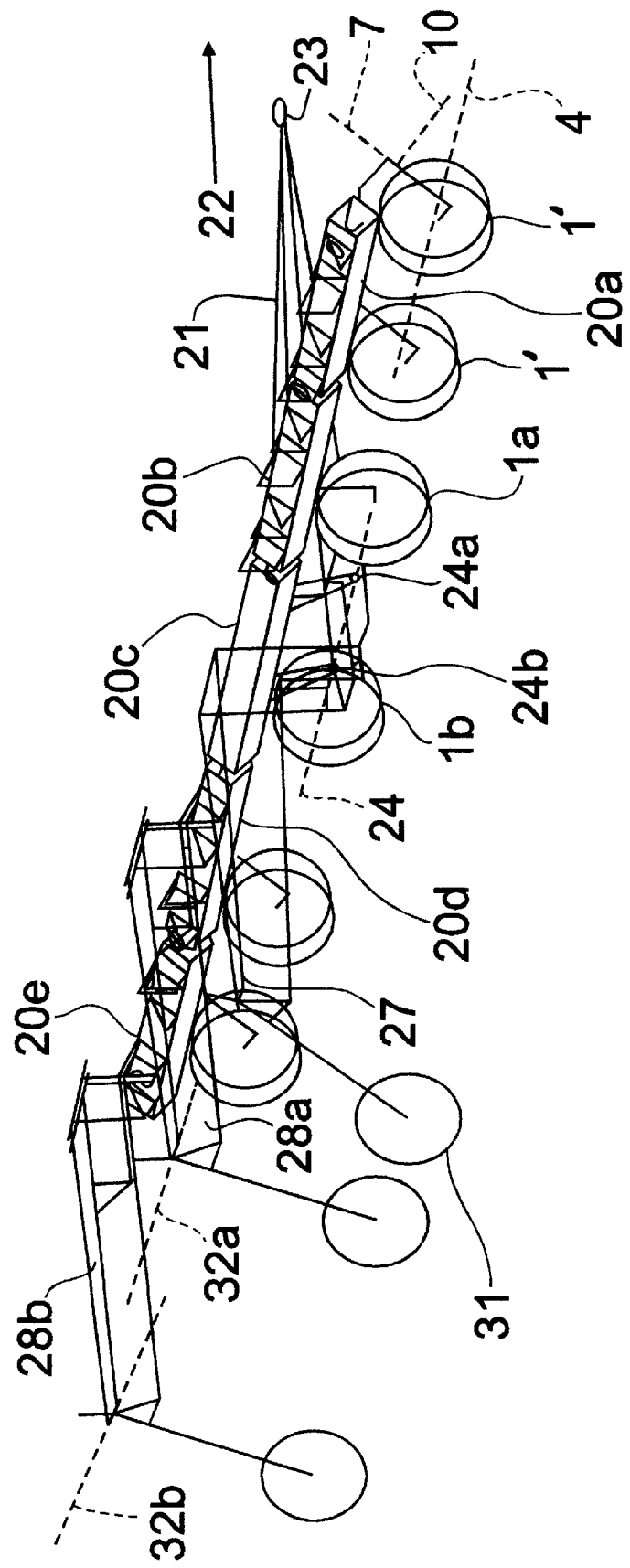
FIG. 2 is a perspective view of the implement in FIG. 1 shown in a raised non-working position.
Figure 3:
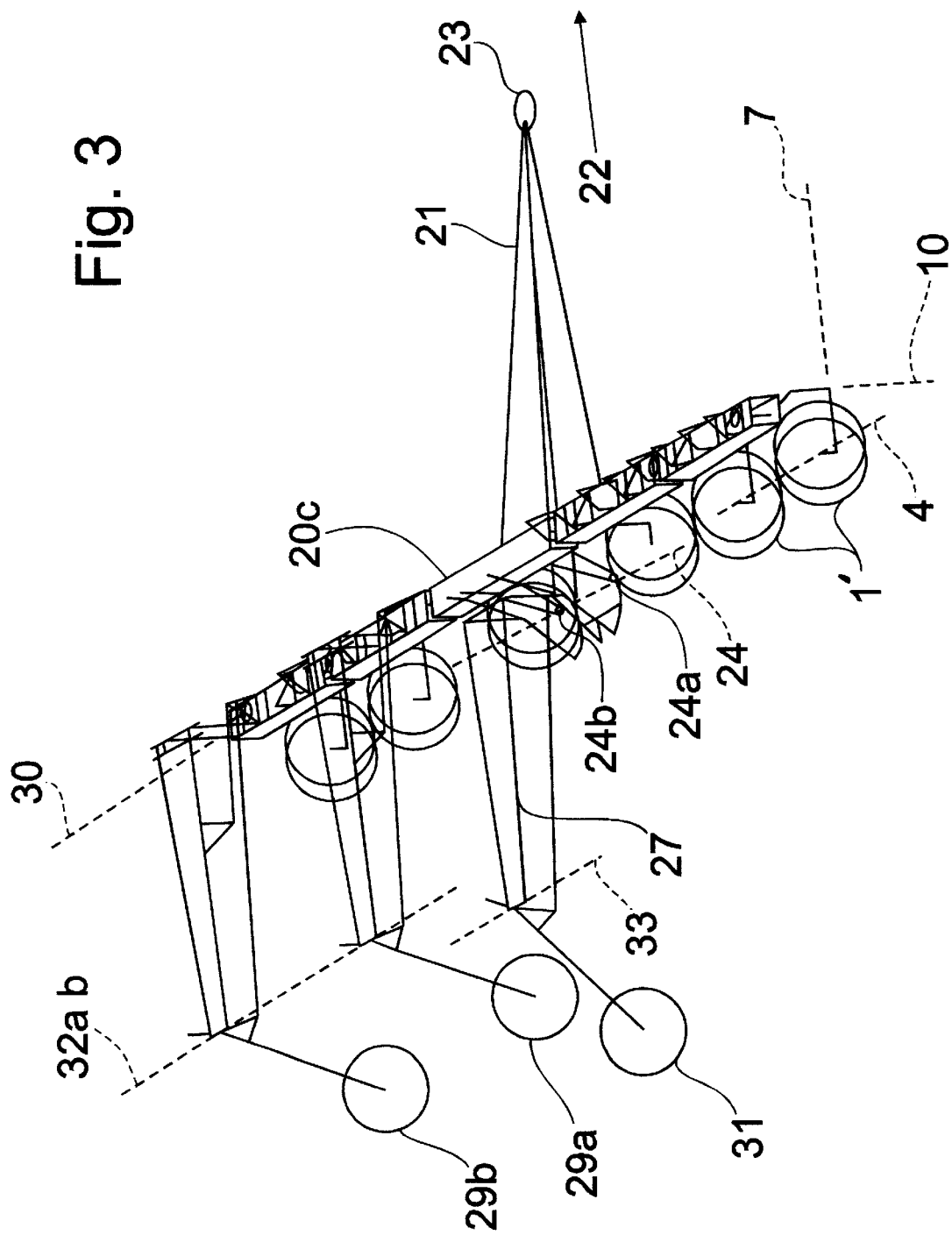
FIG. 3 is a perspective view of the implement in FIG. 1 shown with the drawbar fully rotated and raised to an intermediate position.
Figure 12:
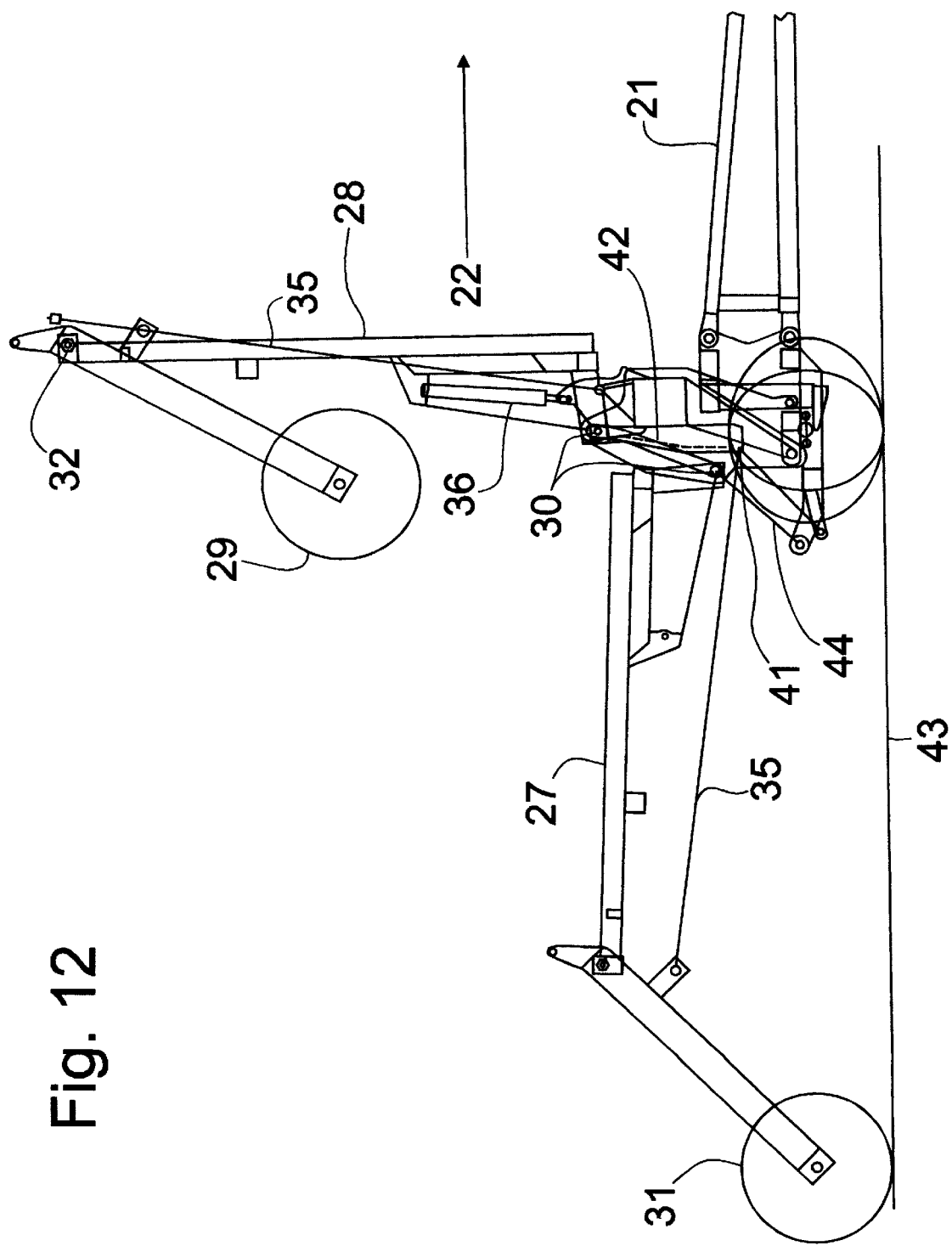
FIG. 12 is a schematic side view of the implement in FIG. 1, showing wing subframes having been raised to a transport position and showing the center subframe remaining in a low position.
Figure 13:
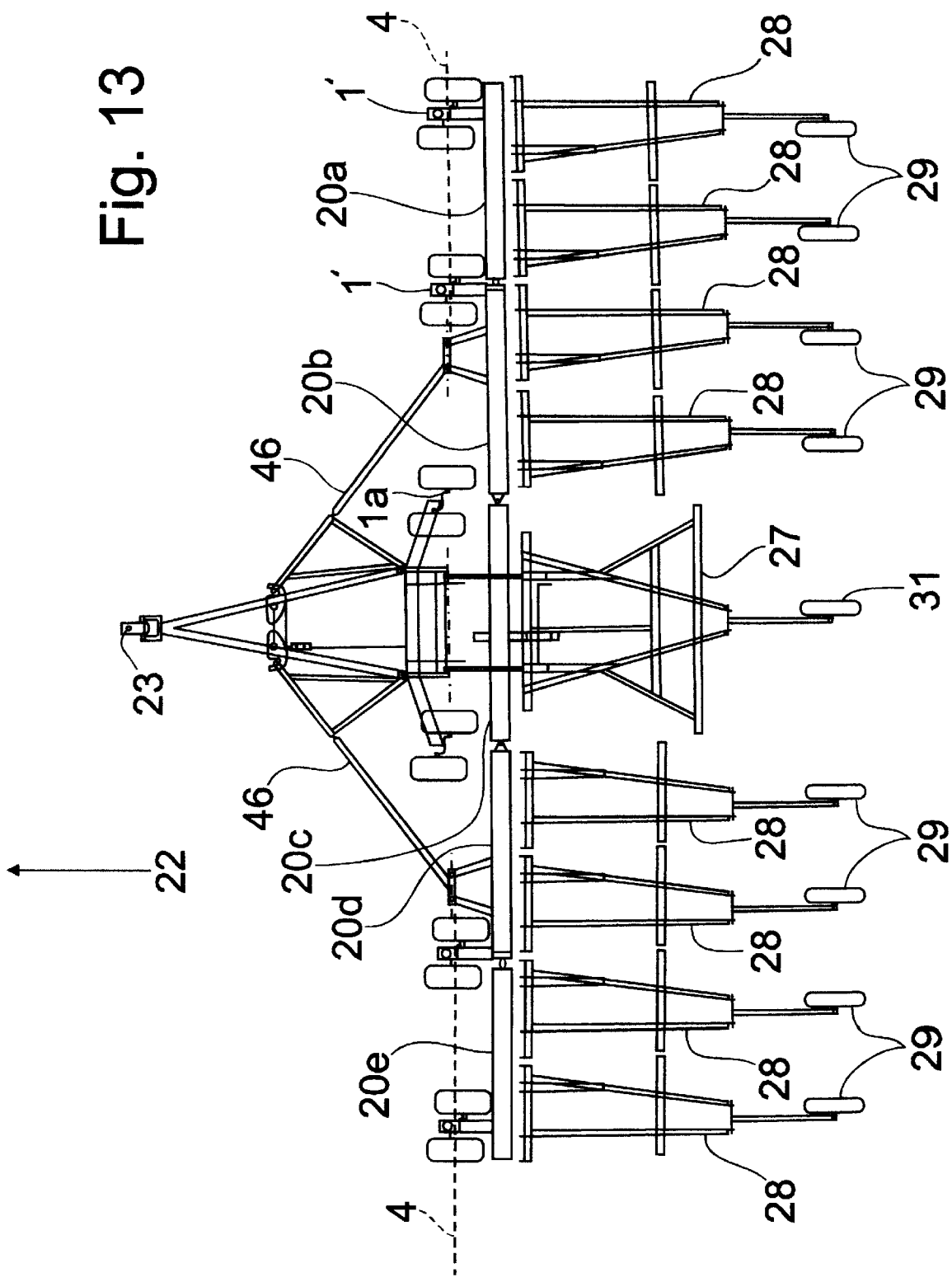
FIG. 13 is a schematic plan view of the implement in FIG. 1, shown in a working position.
Figure 14:
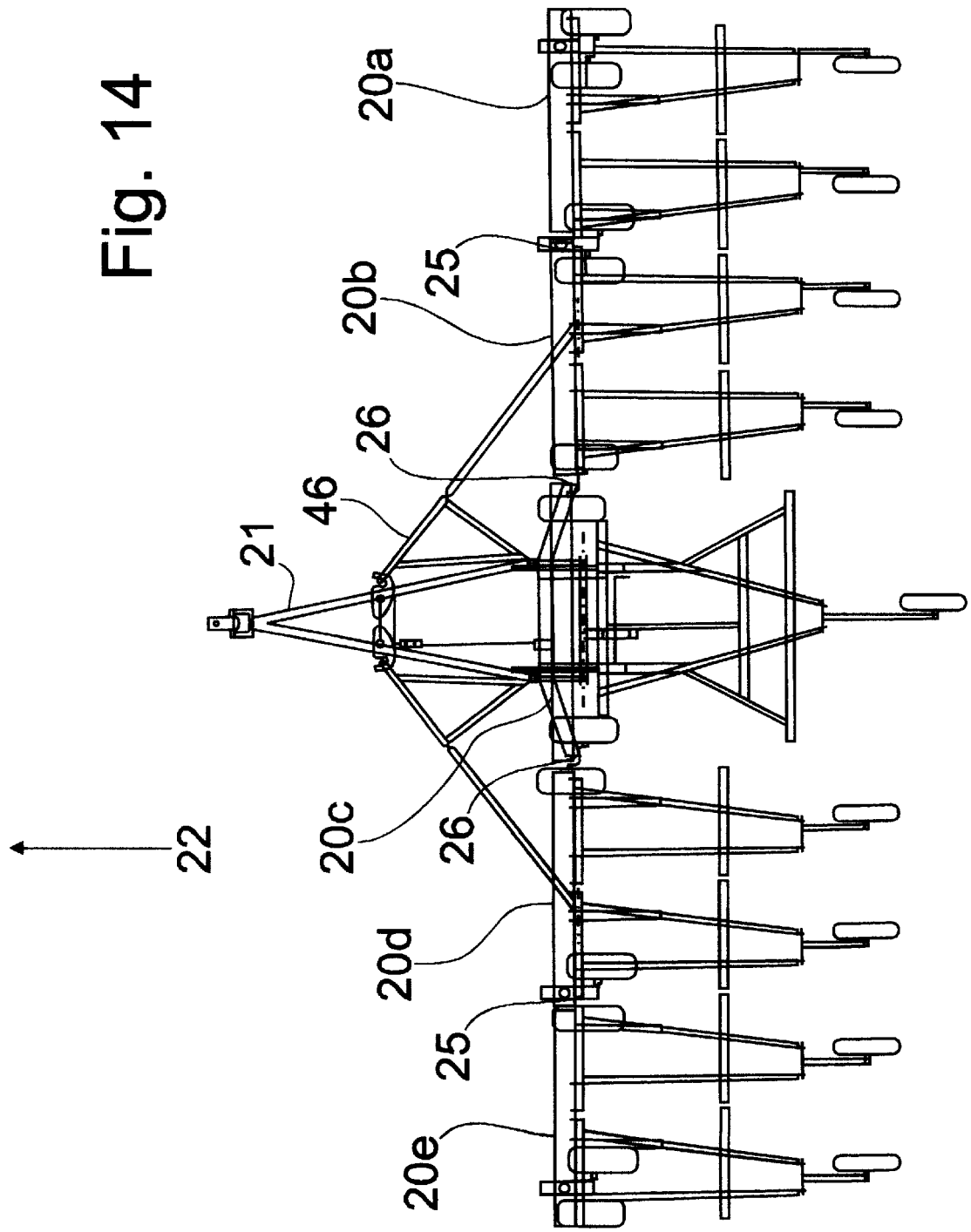
FIG. 14 is a schematic plan view of the implement in FIG. 1, shown in the intermediate position.

A modular assembly of one configuration of an implement according to the invention is shown in plan view in FIG. 13. It is shown schematically in FIGS. 1–5, and side views of various positions of the implement are shown in FIGS. 6–12. It is shown having a hitch section 21 with a tongue 23 for connection to a pulling vehicle (not shown). The hitch section is supported on a set of ground wheel assemblies 1, which the support the hitch section 21 to roll above the ground as it is pulled in an operating or transport direction 22. Further direction references made within this description are made in relation to the operational direction 22. A drawbar 20 is pivotally attached to the hitch section 21 on a transverse pivot axis 24, at joints 24a and 24b. Subframes 27 and 28 are pivotally attached to the drawbar 20 and in a working position shown in FIG. 1 and FIG. 6. The subframes extend rearwardly of the drawbar and are supported parallel to the ground surface. Wheel assemblies 29 and 31 are pivotally attached to the rearward end of the subframes 28 and 27 respectively, for supporting the pivotal subframes at a level above the ground. The wheel assemblies 29 and 31 are linked to the drawbar 20 for coordinating the pivotal movement and position of the wheel assemblies with that of the drawbar as the drawbar 20 is pivotally operated about axis 24. Details of the coordination of these movements will be described in greater detail below.

Figure 5:
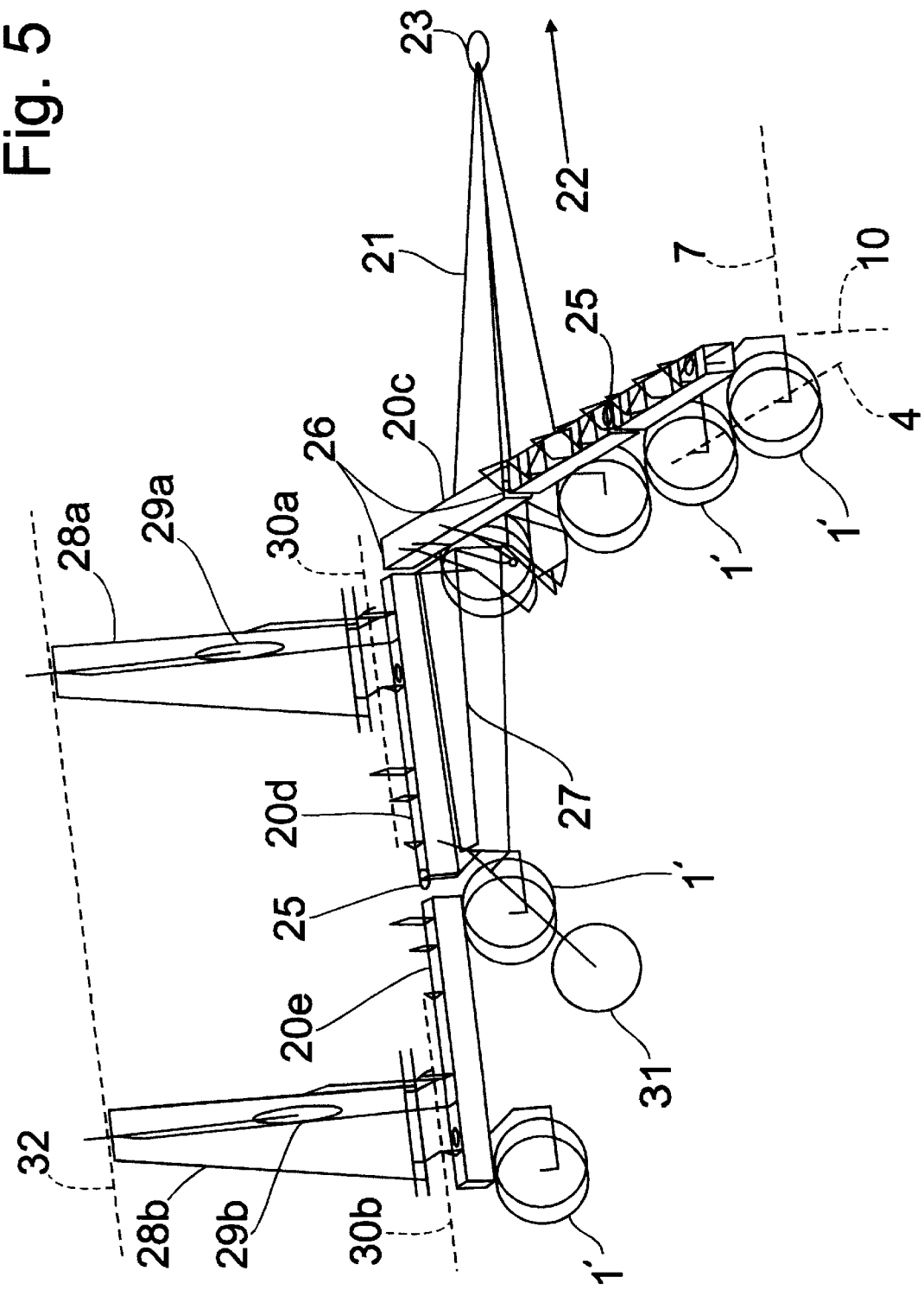
FIG. 5 is another perspective view of the implement in FIG. 1 showing one of the wing sections of the drawbar folded rearwardly to a compact transport position.

The drawbar 20 extends laterally behind the hitch section 21 and is divided into sections with a center section attached to the hitch having a wing section attached to each lateral end of the center section. Wide models of the implement may have additional wing sections attached to each side, defining inner wing sections 20b and 20d and outer wing sections 20a and 20e of the drawbar on each side of the center section 20c. Each wing section is attached at a first end to an adjacent inner section an is supported by a wing wheel assembly 1' at a point toward a distal second end of the wing section. The wing attachment provides pivotal movement of the wing section so that the distal end is allowed movement up or down relative to the inner end when the drawbar is in any of its positions ranging from a working position to a transport position. In a working position, the drawbar 20 is rotated rearward and downward to set the ground engaging tools at a ground engaging depth within the ground. In an intermediate position the drawbar is rotated fully upward in which the ground engaging tools are raised out of contact with the ground. In the transport position, the drawbar wing sections are pivotally folded to trail rearwardly of the center section 20c, as seen in FIG. 5 which shows wings on one side of the implement folded so.

Figure 6:
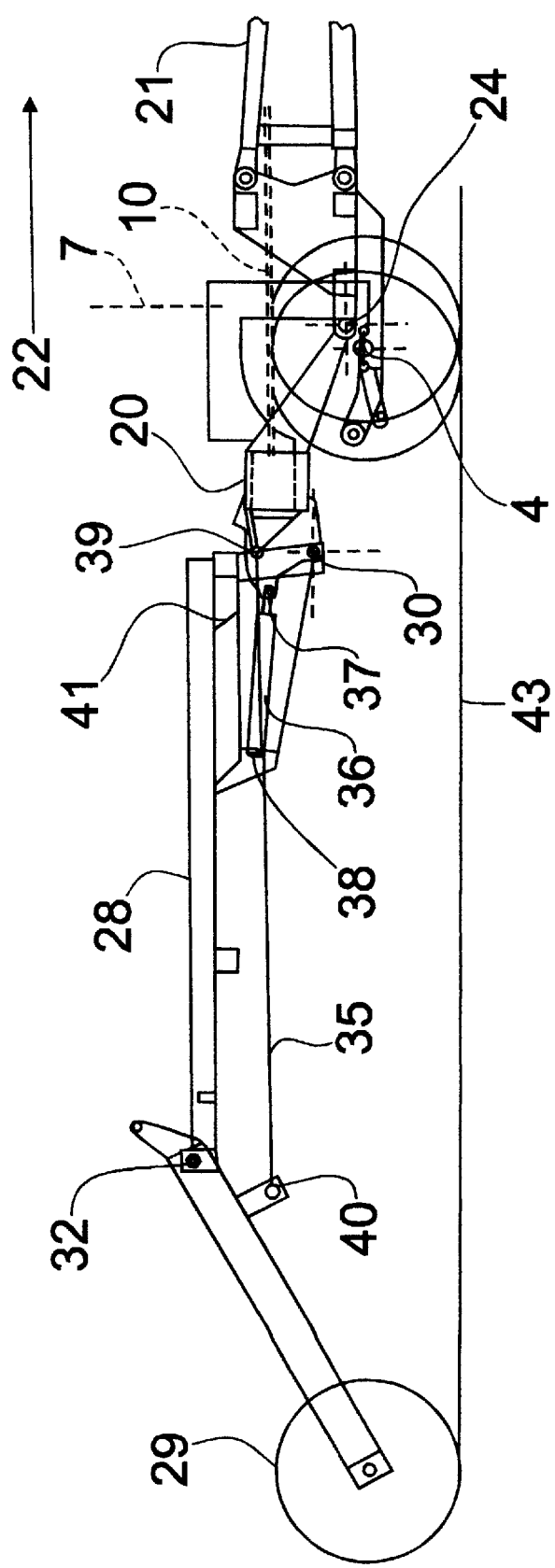
FIG. 6 is a schematic side view of the implement in FIG. 1 shown in a working position, the ground engaging tools not being shown for purposes of clarity.

FIG. 6 shows that a subframe 28 is attached to the drawbar 20 and is pivotal relative to the drawbar about an axis 30. The pivotal movement of the subframe relative to the drawbar is controlled by an actuator 36 which is attached at one end 38 to the subframe and at another end 37 to the drawbar. As viewed in FIG. 6, retraction of the actuator will effect clockwise rotation of the subframe relative to the drawbar. A link 35 is connected at one end 39 to the drawbar and at another end 40 to the subframe wheel assembly 29. When the subframe is rotated clockwise relative to the drawbar 20, the link will allow the wheel assembly 29 to rotate clockwise relative to the subframe 28. As the subframe is rotated clockwise relative to the drawbar, and the wheel assembly is thus also rotated clockwise, then the subframe 28 will be lowered toward the ground. The link is connected to the drawbar 20 and wheel assembly 29 such that the amount of rotation of the wheel assembly 29 relative to the rotation of the drawbar 20, is such that the subframe 28 will be raised and lowered in a level manner through a working range of positions so that it is maintained parallel to the ground in such a range of positions. The rotation of the drawbar relative to the hitch remains free, so the hitch remains floating, as is common with many implements of this type. The portions of the frame supporting the ground working tools are supported by wheel assemblies 1, 1', 29 and 31, which are spaced close to each other in fore and aft relation so that the slope of the ground being engaged is closely followed by the framework of the implement which is supporting the ground engaging tools.

Optional actuators can be connected between the hitch section and the drawbar and used to bias the drawbar downward from the hitch section. This transfers the weight of the hitch section onto the drawbar so extra force is available to press the ground working tools into engagement with the ground to the desired set working depth. The subframes bear much of the weight of the drawbar when it is in the downward rotated position, the drawbar sections also being partially supported by wheel assemblies 1 and 1' so the drawbar remains at a constant height and follows a slope of land which may roll up or down to the left or right of the center of the implement. Pivotal movement of the subframes relative to the drawbar also accommodate variations in pitch of the ground up or down fore and aft of the implement. This pitch may vary from the left to the right side of the implement. The subframes are able to accommodate such variation in a manner described in more detail below.

Figure 9:
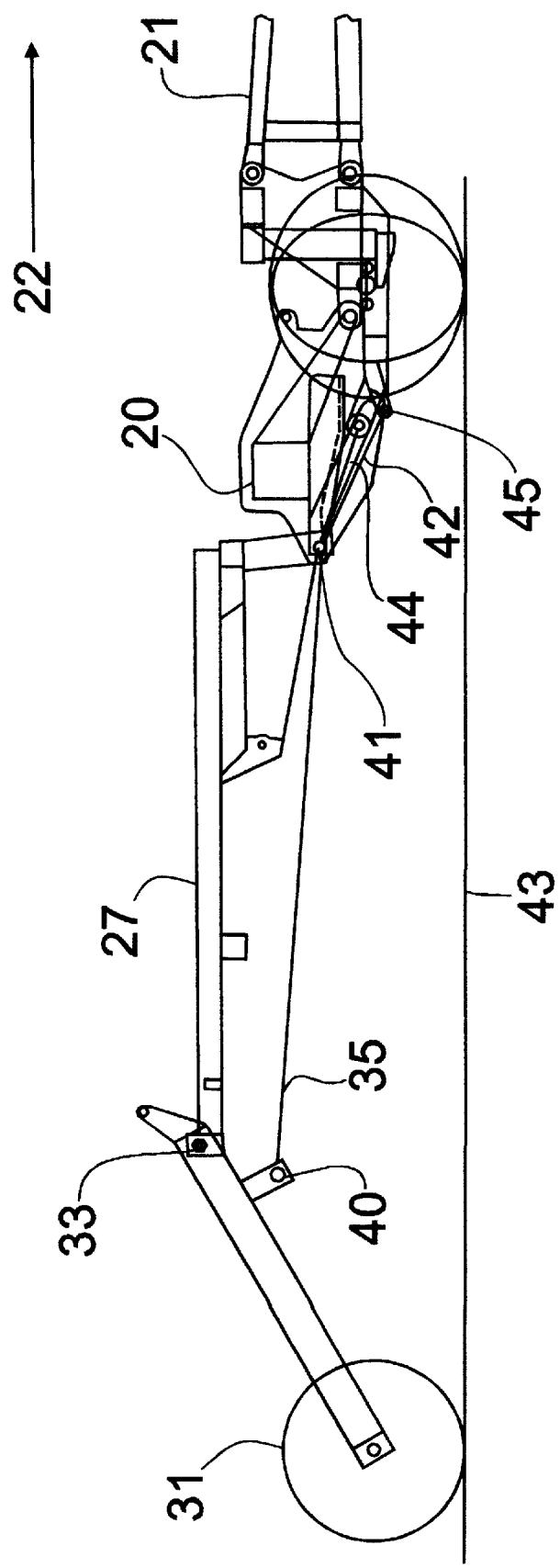
FIG. 9 is a schematic side view of a center subframe of the implement in FIG. 1, shown in a working position.
Figure 10:
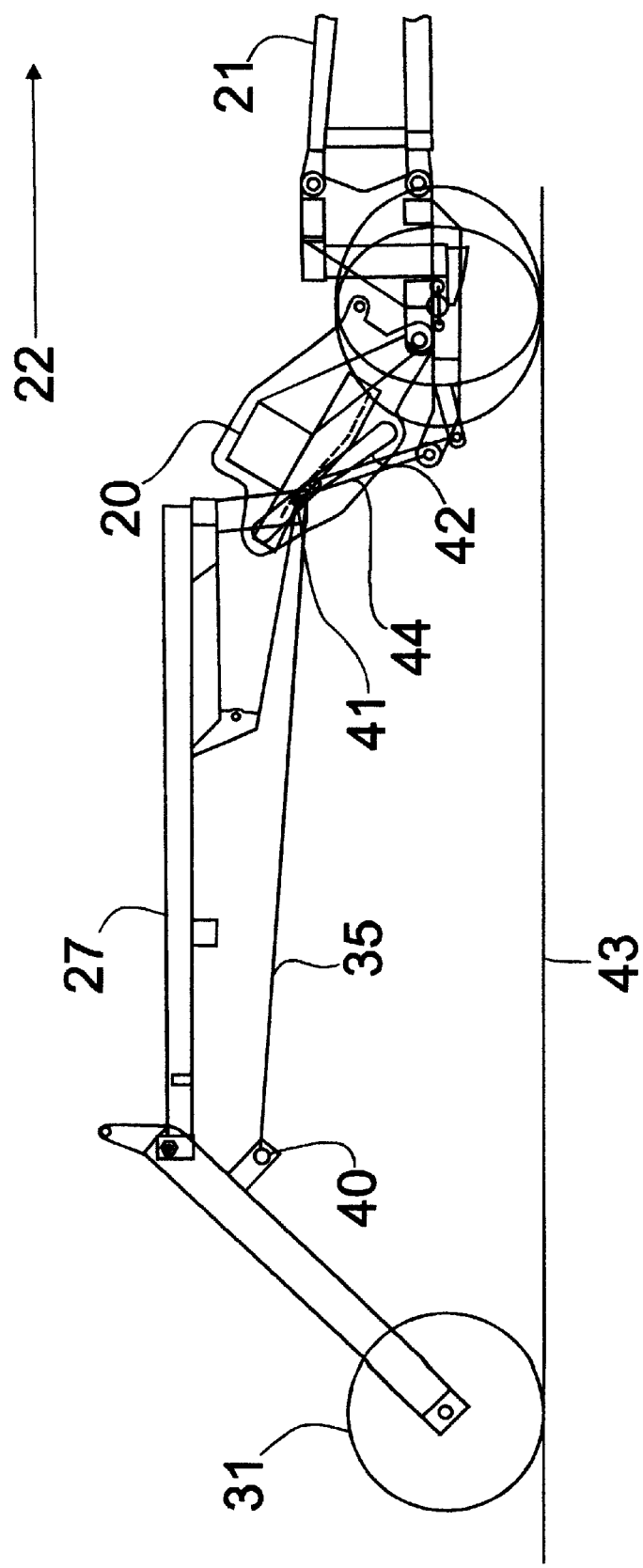
FIG. 10 is a schematic side view of the center subframe in FIG. 9, shown with the drawbar being rotatably raised to a headland position such as in FIG. 7.
Figure 11:
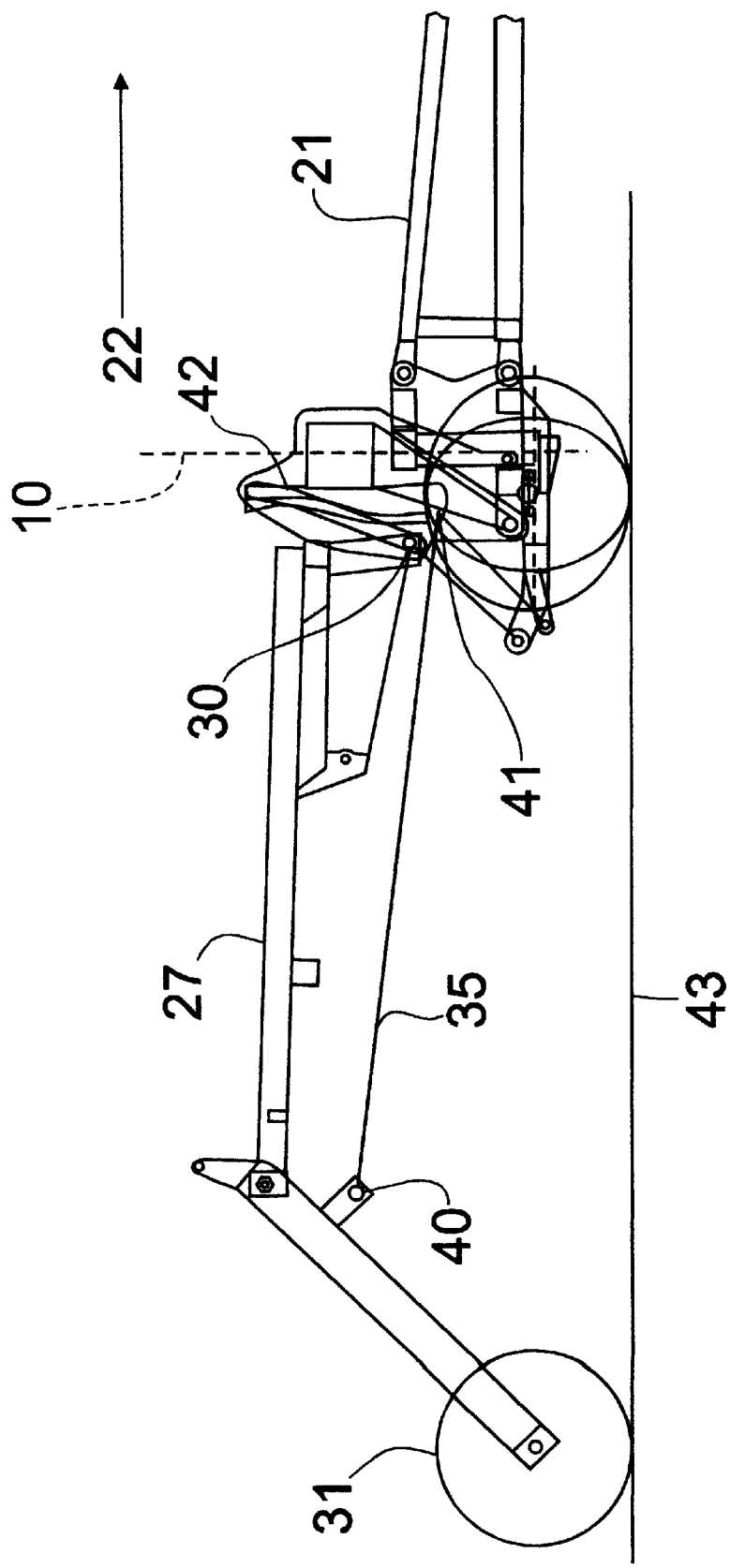
FIG. 11 is a schematic side view of the center subframe shown in FIG. 9, shown in a low position with the drawbar being fully rotated and raised to the intermediate position as in FIG. 3.
Figure 15:
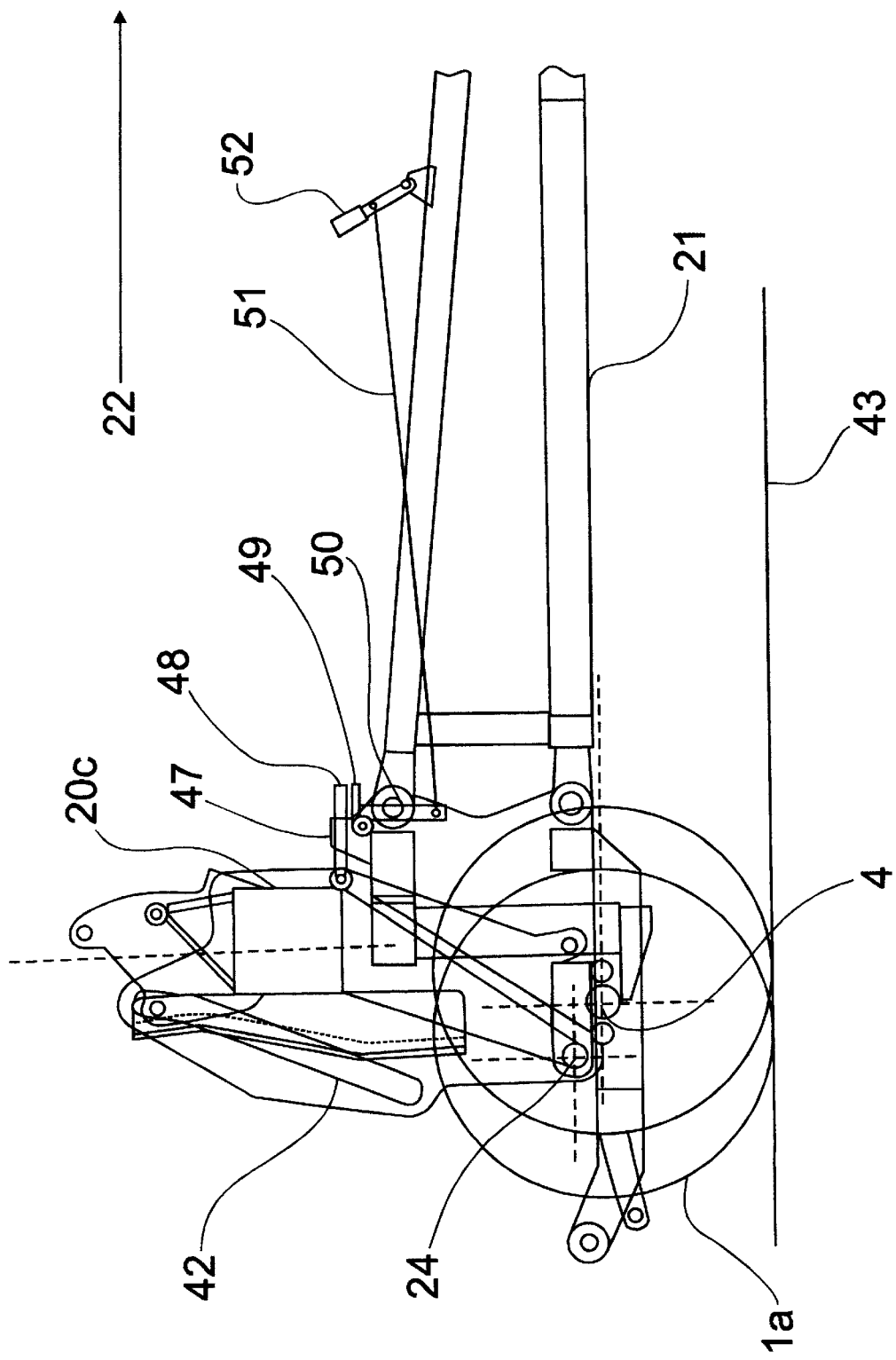
FIG. 15 is a detail view of the hitch frame showing a locking mechanism for locking the drawbar to the hitch frame, restricting it from downward rotation.
Figure 16:
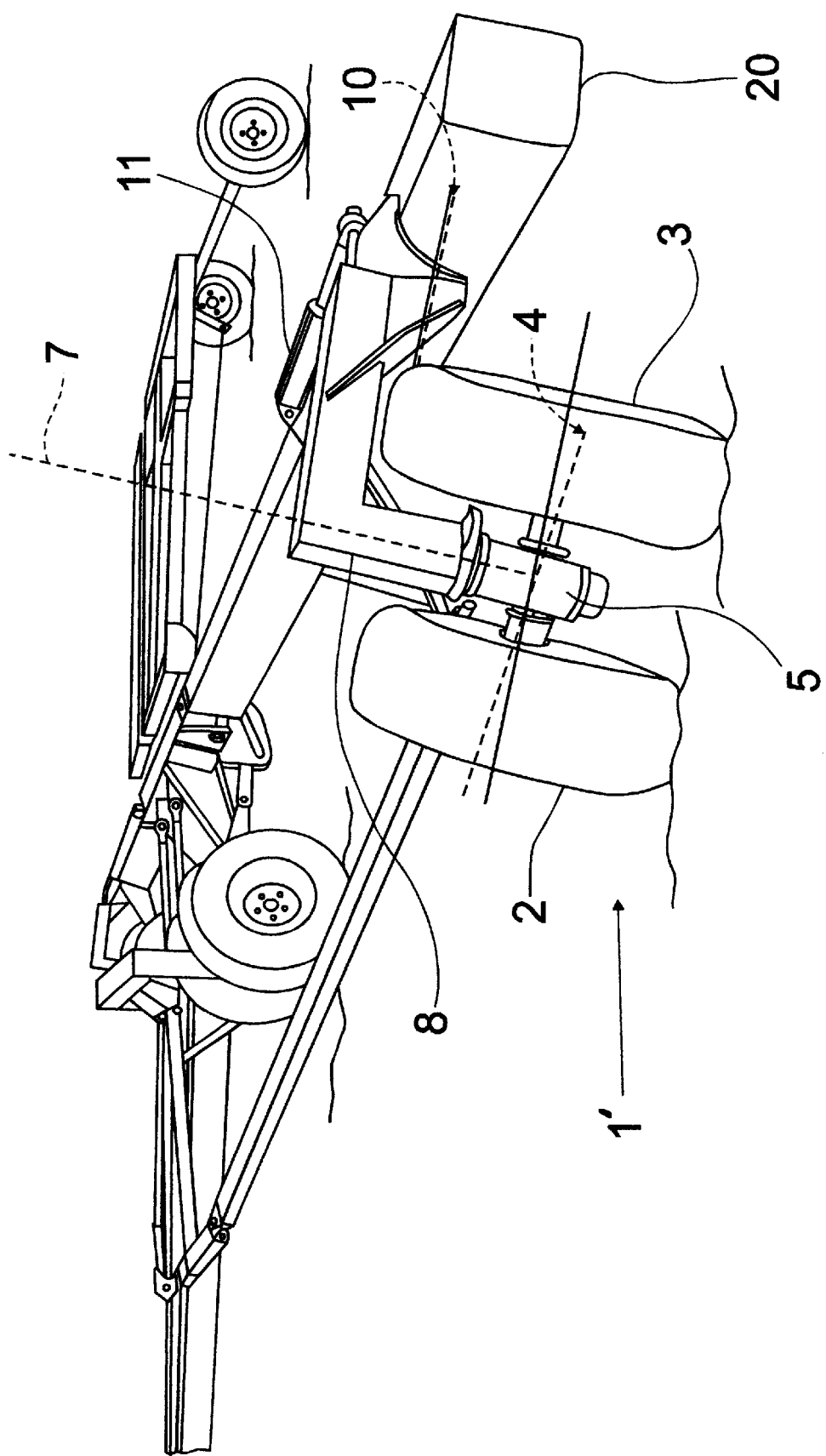
FIG. 16 is an illustration of a modular implement like that shown in FIG. 1, but having only 3 drawbar sections, and showing the detail of a wing wheel assembly with its respective wheel position actuator, the drawbar being shown in a deep working position.
Figure 17:
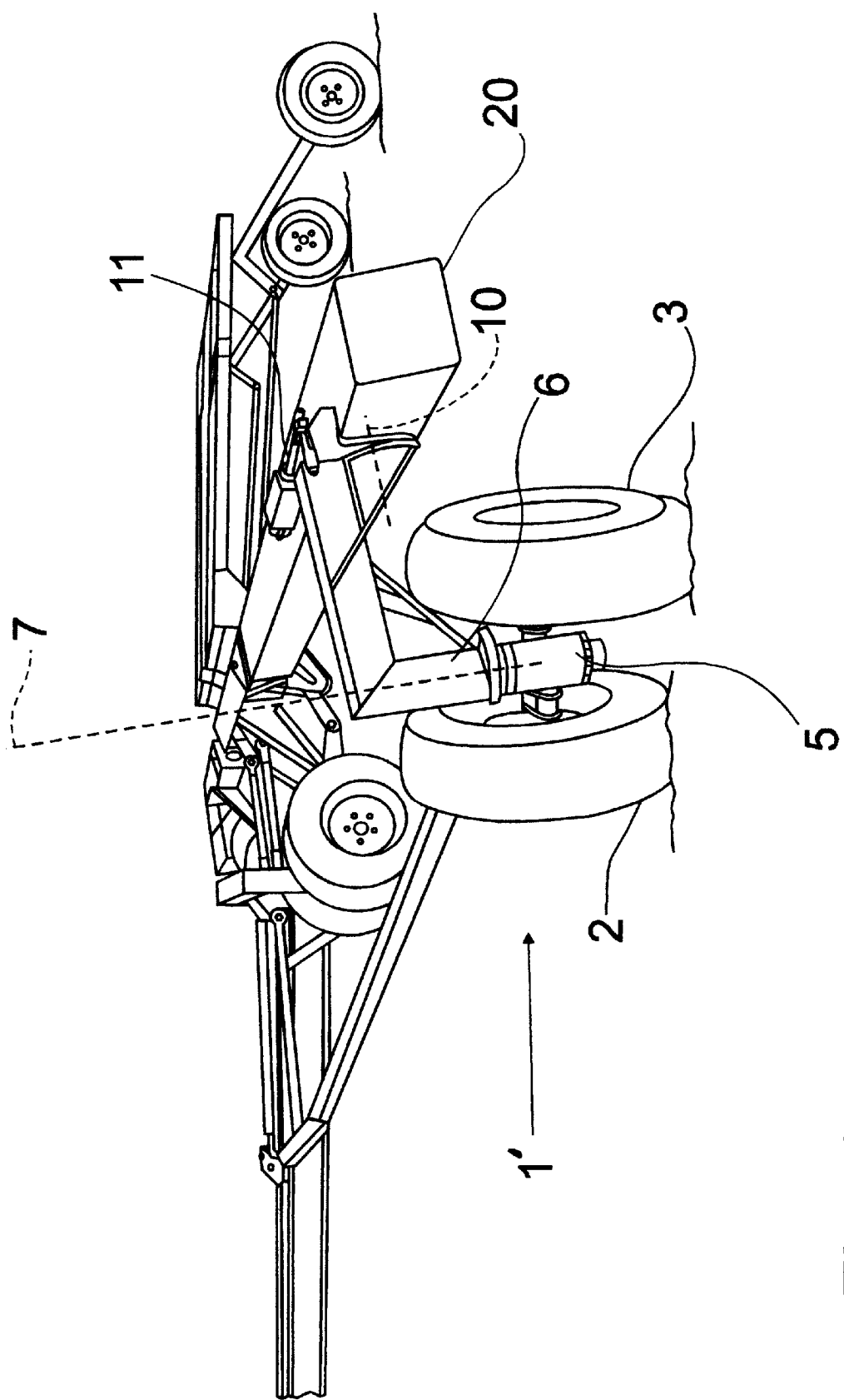
FIG. 17 is a illustration of the implement in FIG. 16 shown with the drawbar rotated to a shallow working position.

A subframe 27 is shown attached to the drawbar center section 20c shown in a working position in FIG. 9. The forward end of the subframe 27 is supported in a slot 42, the slot being a part of a plate like member attached to the drawbar, the plate member also having a journal for attaching the drawbar to the hitch at axis 24. The detail of the plate member is shown in FIG. 15. Two such plate members are spaced laterally on the drawbar center section 20c to either side of the center of the section as can be seen in FIG. 13. A track member is also attached to the drawbar center section which guides movement of the first end 41 of the wheel assembly link 35. Link 44 is pivotally attached at one end to the hitch section and at the other end is pivotally attached to the subframe 27 at 30. Link 42 is pivotally attached at one end to the hitch section 21 and at the other end is pivotally attached to the first end 41 of link 35. As the drawbar is rotated, link 44 guides the movement of the subframe at point 30 along the slot 42, while the link 44 guides the movement of the link end 41 along the track member. This maintains the center subframe in a low position when the drawbar is rotate fully up to the intermediate position. This provides clearance between the center subframe and ground engaging tools attached to the underside of the wing subframes when the drawbar wings are folded rearward to the transport position shown in FIG. 5.

Modular Subframe Construction

The modular assembly of one configuration of an implement according to the invention is shown in plan view in FIG. 13. This configuration is assembled with subframes that are adapted for attaching 2 rows of disc type ground engaging tools (not shown) on fore and aft transverse toolbars of each subframe. The subframes 28 and 27 are attached to a drawbar 20 and are attached laterally adjacent one another to extend transversely across a wide path on the ground. Subframes 28 which are to the right of the center of the drawbar are generally identical which has obvious manufacturing advantages, reducing cost of construction. Subframes 28 to the left of the center of the drawbar 20 are generally identical and symmetric to those on the right, also having cost reducing manufacturing advantages. A subframe 27 is attached to a drawbar center section 20c. This subframe is controlled differently from subframes 28 as has been described above.

An alternate subframe construction (not shown) is available for assembly with the drawbar, and when configured with such subframes, the implement is operable as a cultivator or hoe drill seeder. The alternate subframes can comprise of multiple transverse toollbars: 3, 4, or 5, as may be desirable for various arrangements of ground engaging tool supports (not shown) which can be attached to the toolbars as is common in cultivator construction. The alternate subframes of this configuration can be supported at the rearward ends by alternate wheel assemblies 29 and 31, which can have a gang of press wheels attached at their first ends for rolling support of the subframe while also providing closing and packing of each of the furrows created by the ground engaging tools as the implement is pulled forward in operation. The press wheels are spaced so that there is one press wheel corresponding to each furrow created by the implement.

Parallel Actuator Hydraulic Circuit

As the implement is pulled across the ground, uneven slopes that roll and pitch may be encountered by the implement framework. The roll can be easily accommodated by jointed drawbar sections similar to that which is common on agricultural harrow implements and somewhat similar to conventional folding cultivators. Variations in pitch can also be accommodated by the present invention in a manner which is similar to that on agricultural harrow implements, the application of which was not before obvious as applied to cultivators and seeding implements which required the ground engaging depth of the ground engaging tools to be accurately controlled. The present invention provides rear wheel assemblies on each of the subframes of the implement so both the forward and rearward end of the subframes are controlled to a set height. The rear wheel assemblies of the present invention are pivotally attached, the movement of which is coordinated with the movement of the drawbar supporting the forward end of the subframes so that the subframes can be easily adjusted to various heights in a range of working positions in which the subframes are maintained parallel to the ground.

Actuators 36, which control the movement of the drawbar and thereby the movement of the subframes, are connected in parallel for simultaneous operation of all the subframe actuators in a common circuit. The connection of the actuators to a common drawbar maintains their retraction and extension in a synchronized manner so the subframes move between various working positions in unison at remain at equal working heights. The subframes are provided independent movement relative to each other about the drawbar pivots 30 so that their frame heights remain equal regardless of variations in ground elevation and slope differences between the subframes from the left to right sides of the implement. When the implement is set at a working position, the circuit controlling the subframe actuators is closed, yet the subframe actuators are still able to communicate fluid between themselves to allow the subframes continued independent movement.

The center subframe 27 is not controlled by an actuator and is positionable by the rotation of the drawbar, the drawbar being controlled by the actuators 36 of the subframes 28.

Depth Averaging Control

Figure 22B:
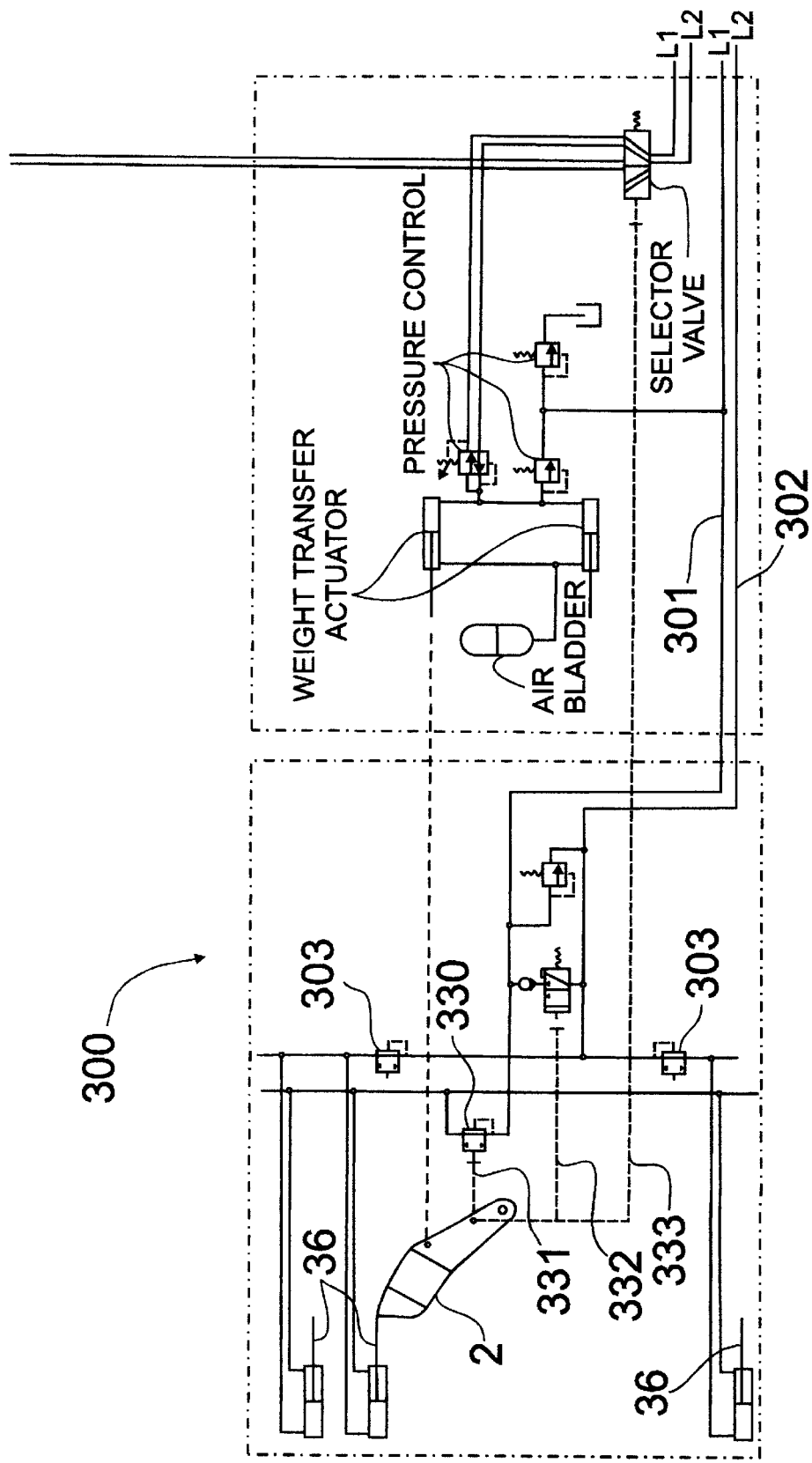
FIG. 22 is a comprehensive hydraulic schematic showing both the wing fold circuit and the subframe actuator circuit with mechanical links superimposed onto the schematic to illustrate a headland position control and other automatic control features.

FIG. 22 schematically shows a depth control circuit 300 for controlling the depth of the ground engaging tools by controlling the movement of the subframe actuators 36. When the subframes are lowered to a working position by retraction of the actuators 36, the implement may not be positioned over level ground. Some subframes may pitch upward at the forward ends relative to others which may be pitched less upward, or even downward.

To lower the implement to a working height, hydraulic pressure is applied to circuit 300 in line 301. This cause actuators 36 to retract, rotating the subframes clockwise relative to the drawbar and rotating the drawbar ccw and downward as viewed schematically in FIG. 22. Fluid displaced from the base ends of actuators 36 during their retraction is returned to the hydraulic reservoir, not shown, via line 302. Depth stop valves 303 are actuated when the level of the subframes has approached a set working height, and flow to line 302 is blocked restricting flow in or out of circuit 300. Actuators 36 of the preferred embodiment are connected to the circuit 300 in two groups, the groups being separately controlled by individual depth stop controls 303. The drawbar wing sections of the preferred implement are provided with rotational movement relative to the center section 20e. Thus the rotation of the drawbar wing sections to the left and right of the center section are controlled separately by the two depth control valves 303 as shown. As each wing section or sections to the left or right of the center section approach the set working position, the respective depth stop control is actuated stopping the drawbar rotation to a set position.

Figure 21:
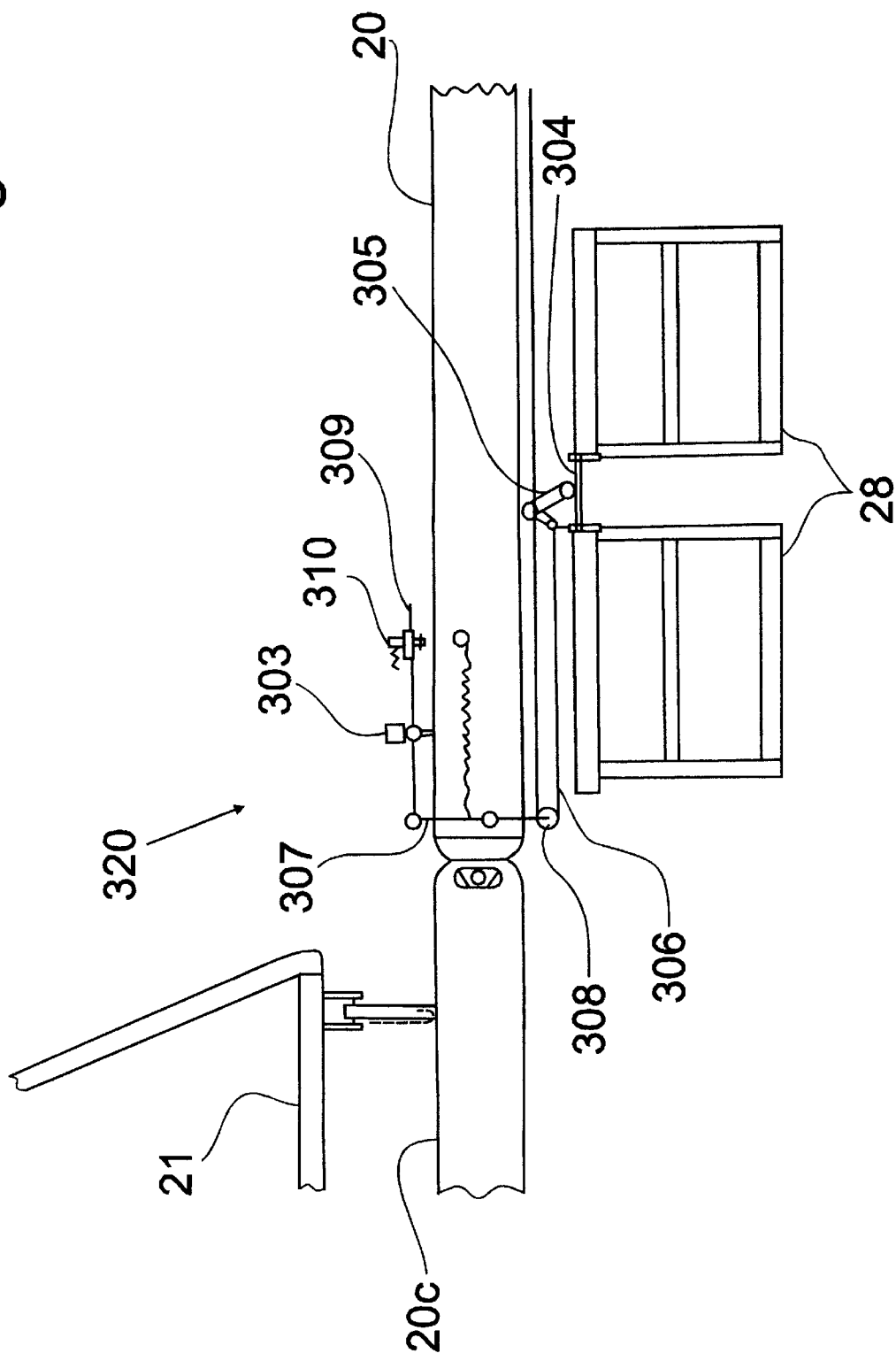
FIG. 21 is a detail illustration of the depth averaging linkage attached to a drawbar wing section of a modular implement such as the one shown in FIG. 1.

FIG. 21 illustrates a depth stop linkage which actuates the depth stop control valve 303. An averaging link 304 is connected to adjacent subframes that are attached to a common drawbar wing section. One, two, or more subframes may be attached to each drawbar section. When two or more are attached it is desirable to use their average position for actuating a depth stop control, so that the drawbar section is set at an average height not effected by a severely pitched position of any one subframe, which may happen if the subframe is on pitched ground, or if the subframe wheel assembly 29 is resting on a clod or rock. A central part of the averaging link 304 abuts a depth control crank 305. The crank 305 is rotated according to the relative rotation between the drawbar and adjacent subframes. The crank 305 is linked to a lever 307 by a linking member 306. The lining member 306 may be directly connected to lever 307, or for an implement having inner and outer wing sections, it can be indirectly linked to the lever 307 as shown in FIG. 21.

A second pair of adjacent subframes (not shown) which are attached to an outer wing section, have an identical averaging link 304 acting on an identical crank 305, to which a link 306 is also connected. Links 306 can be connected to an intermediate lever on one end of lever 307 for averaging the actuation of the links 306, or as shown, link 306 can be a continuous cable with each end attached to cranks 305 with an intermediate portion of the cable looped around a pulley 308 for averaging the actuation of the cable from both ends by cranks 305. This averaged cable displacement rotates lever 307. A link 309 attached to the other end of the lever 307 is thereby operated in a linear manner. A depth stop 310 is adjustably positioned on the link 309, and is setable to a position corresponding to a desired set working height of the implement framework. When the drawbar is lowered and the subframes pivot relative to the (drawbar to actuate the depth averaging link 320, the depth stop 309 will actuate the stop valve 303, stopping further rotation of the drawbar and holding the respective subframes at a set working height.

Headland Position

Figure 7:
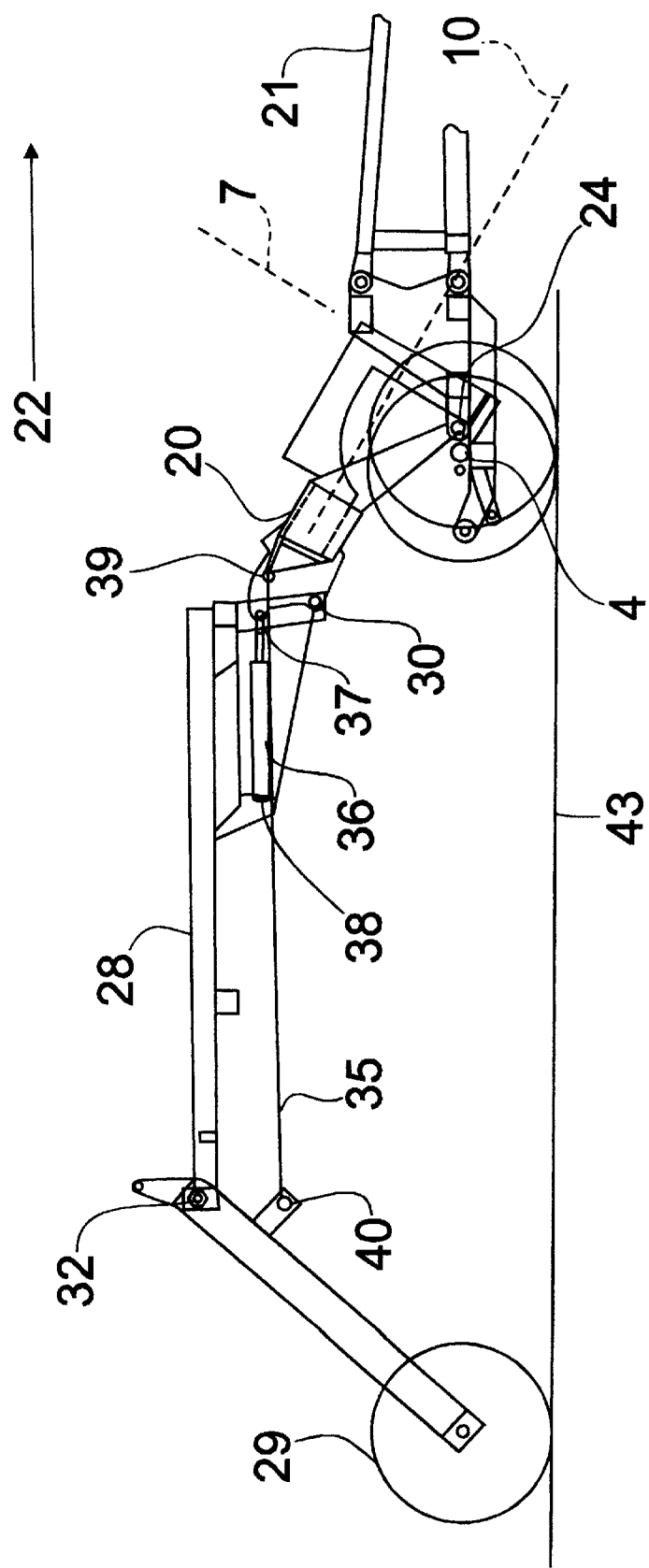
FIG. 7 is a schematic side view of the implement in FIG. 6 shown to be raised to a headland position.
Figure 8:
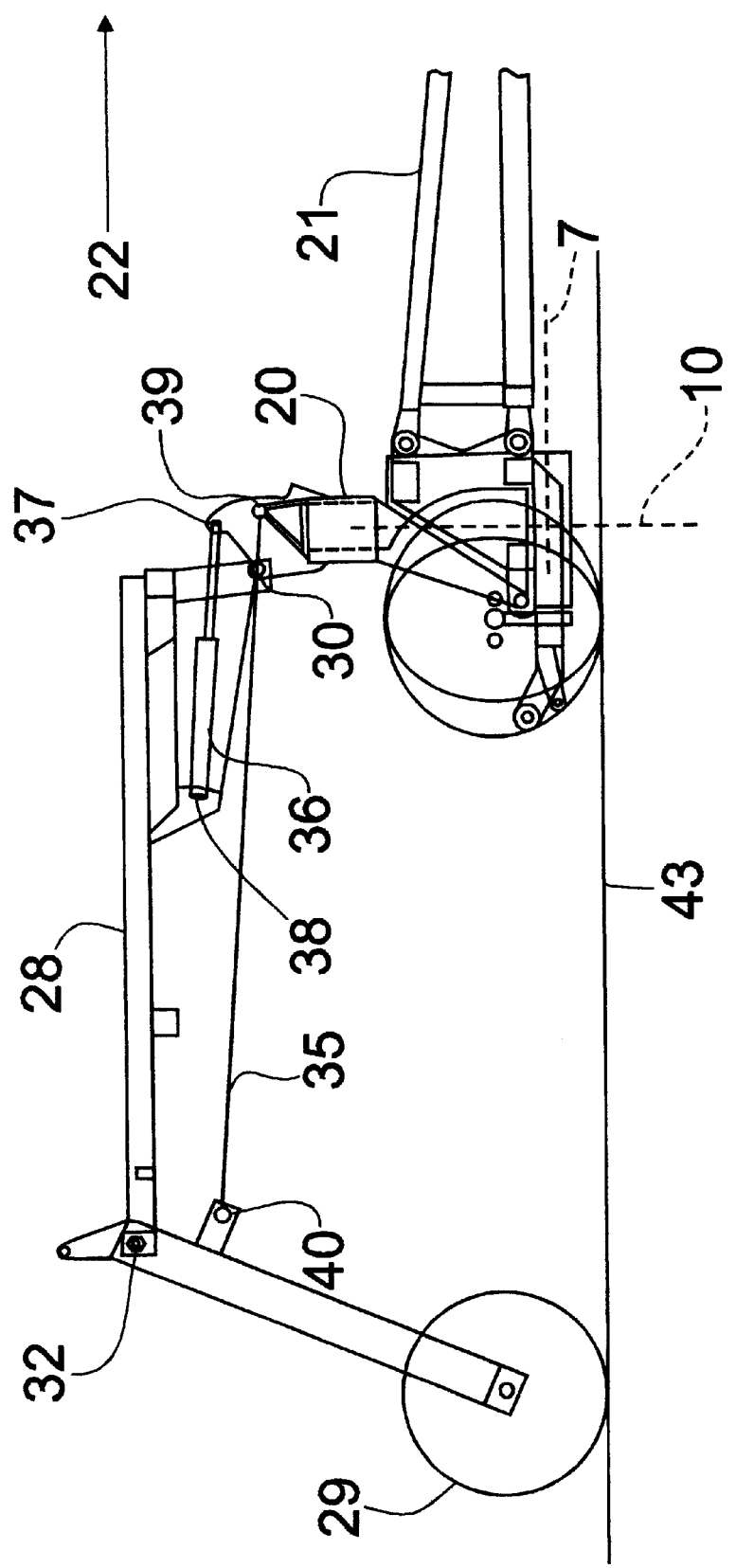
FIG. 8 is a schematic side view of the implement in FIG. 6 shown with the drawbar fully rotated to the intermediate position as in FIG. 3.

FIG. 22 also shows headland stop valve 330. A linkage 331 attached to the drawbar 20 is shown schematically which actuates the headland stop valve 330, when the drawbar reaches a certain position when being raised from a working position in which ground engaging tools are engaging the ground, to a position in which the ground engaging tools are raised out of contact with the ground. The headland link (not otherwise shown) includes a stop which is adjustable along the length of the link. The stop can be set to actuate the headland valve 330, when the drawbar is raised to a position about 30 degrees up from the working position as shown in FIG. 7. This is a position to which the implement is raised at field headlands to raise the ground engaging tools just enough to allow turning of the implement at headlands. This can be a position in which the ground engaging tools are out of contact with the ground, or in which the tools are in shallow contact with the ground, providing a sweeping action so no wheel tracks remain visible where the implement is turned. From this position the implement ground engaging tools can be more quickly set back to a working depth.

A bypass linkage (not shown) is connected a drawbar locking crank 50 which is visible in FIG. 15. The lock crank 50 is operable from handle 52 and can be positioned to abut with lock 48 that is attached to the drawbar 20, lifting it out of engagement with lock hook 47 that is attached to the hitch section 21. When the crank 50 is rotated clockwise as viewed in FIG. 15, then the lock 48 is engagable with hook 47 when the drawbar becomes fully raised up. The bypass link (not shown) is also operated by crank 50 so that it shifts the alignment of headland link 331 (also not shown in FIG. 15) so that it does not engage the headland stop 330 as the drawbar is being raised up. In this way the drawbar can be fully raised up and not stopped at the headland position.

An alternate implement used for supporting precision row planting devices, is provided with a similar headland position stop. The mechanism of operation of the headland stop in this implement is different, but the general function is the same. The planting implement comprises a drawbar hitch for connection to a pulling vehicle, a transversely extending toolbar pivotally attached to the drawbar about a transverse axis for rotation between a downward working position and upward non-working positions, and having planting devices attached in spaced relation along the toolbar. The implement includes a hydraulic circuit with a toolbar actuator for rotating the toolbar between positions, and hydraulic valves for controlling the hydraulic circuit.

The implement also includes an electronic control system which is connected to solenoids that operate various hydraulic valves within the hydraulic circuit, and in particular, controls the operation of a toolbar actuator valve to allow or restrict hydraulic flow which operates the toolbar actuator. The headland stop control comprises a proximity sensor attached to the drawbar, the sensor being of the type which has electrical characteristics which change when a ferrous material is placed proximate to the sensor. The toolbar of the implement has attached to it a steel plate which works in cooperation with the proximity sensor. The position of the headland sensor is adjustable on the drawbar so that the position of the toolbar in which the steel plate becomes proximate to the sensor can be adjusted to vary the headland position. As the toolbar is being raised from a working position to a non-working position, the steel plate is rotated with the toolbar and becomes proximate to the headland sensor. This signals the electronic controls system to cause actuation of the toolbar hydraulic valve to stop the upward movement of the toolbar.

The electronic control system includes an override switch which, among other functions, interrupts the headland stop signal so that the toolbar may be raised to a fully upwardly rotated position. As for the headland stop position of the implement previously described, the headland stop control of this alternate implement stops the toolbar when it is being raised at headlands, at a position from which it can be more quickly be reset to a working position again than if it had to travel from a more upwardly raised position.

Unfold Circuit with Wheel Control in Combination

Figure 18:
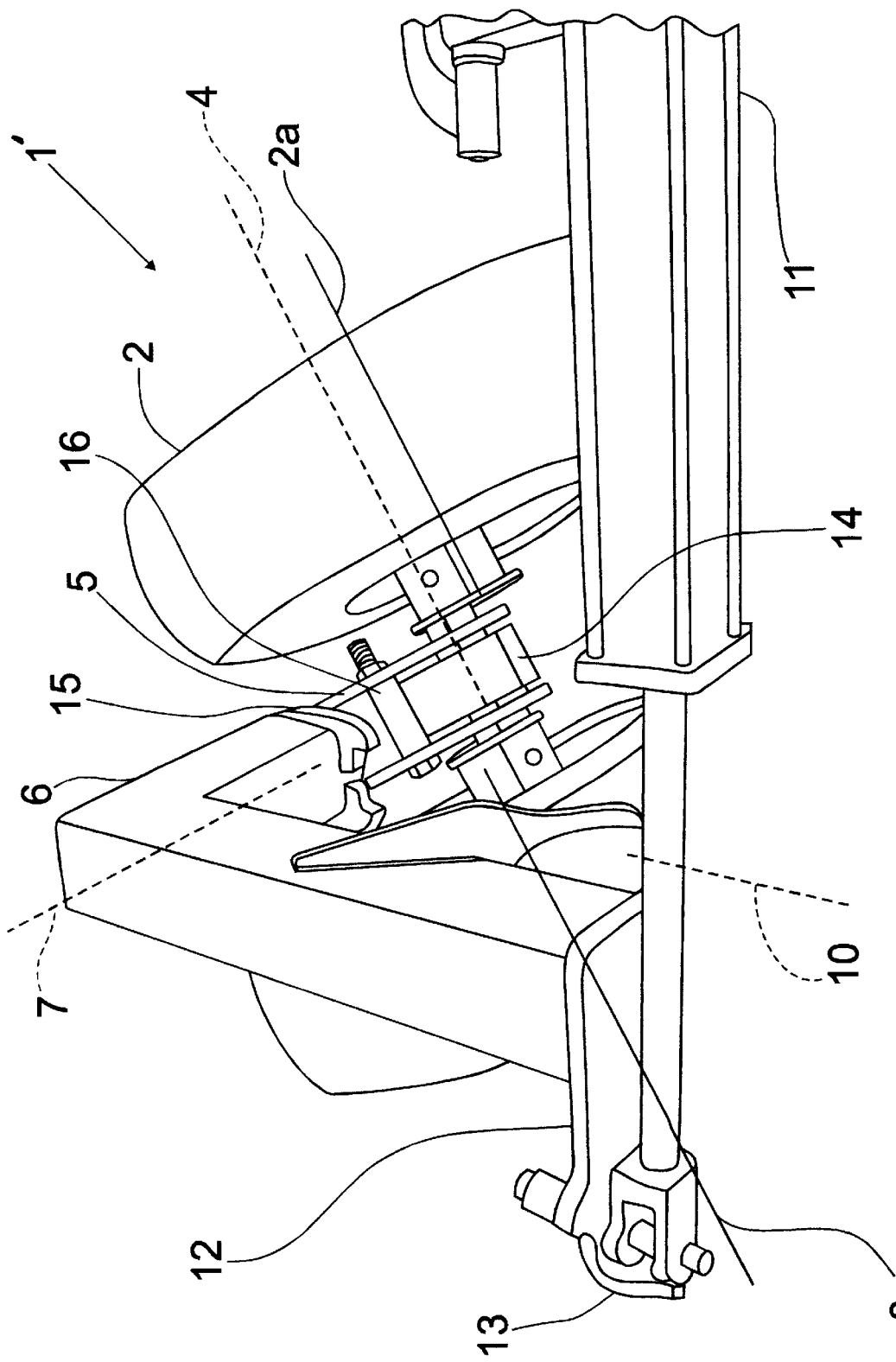
FIG. 18 is a detailed illustration of a wing wheel assembly caster locking mechanism and wheel position actuator, showing the locking mechanism unlocked, and the wheel assembly actuated to a field position.
Figure 19:
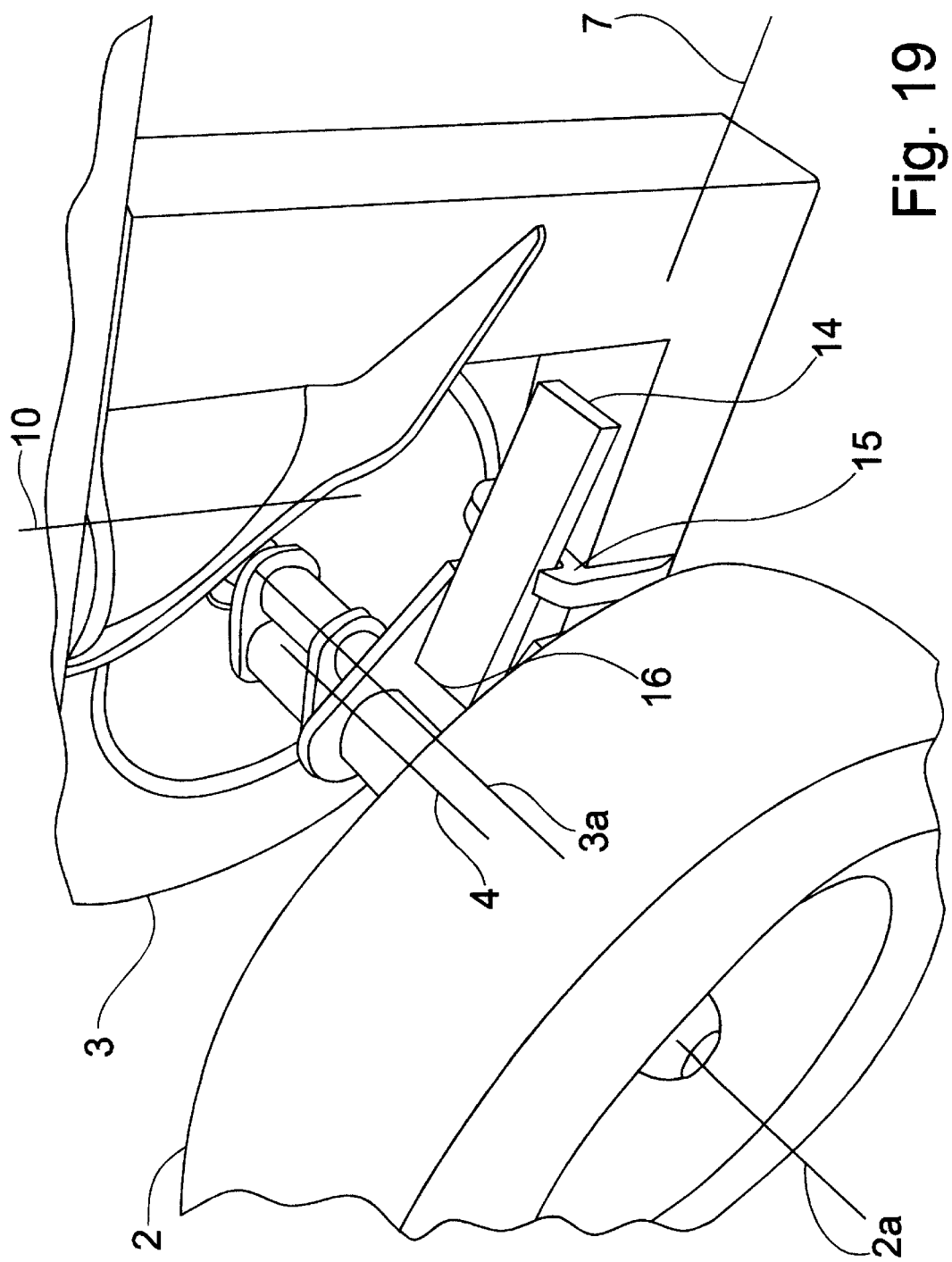
FIG. 19 is the wheel assembly in FIG. 18 shown to be actuated to a transport position and the locking mechanism in the locked position, restricting the caster action of the wheel assembly.
Figure 20:
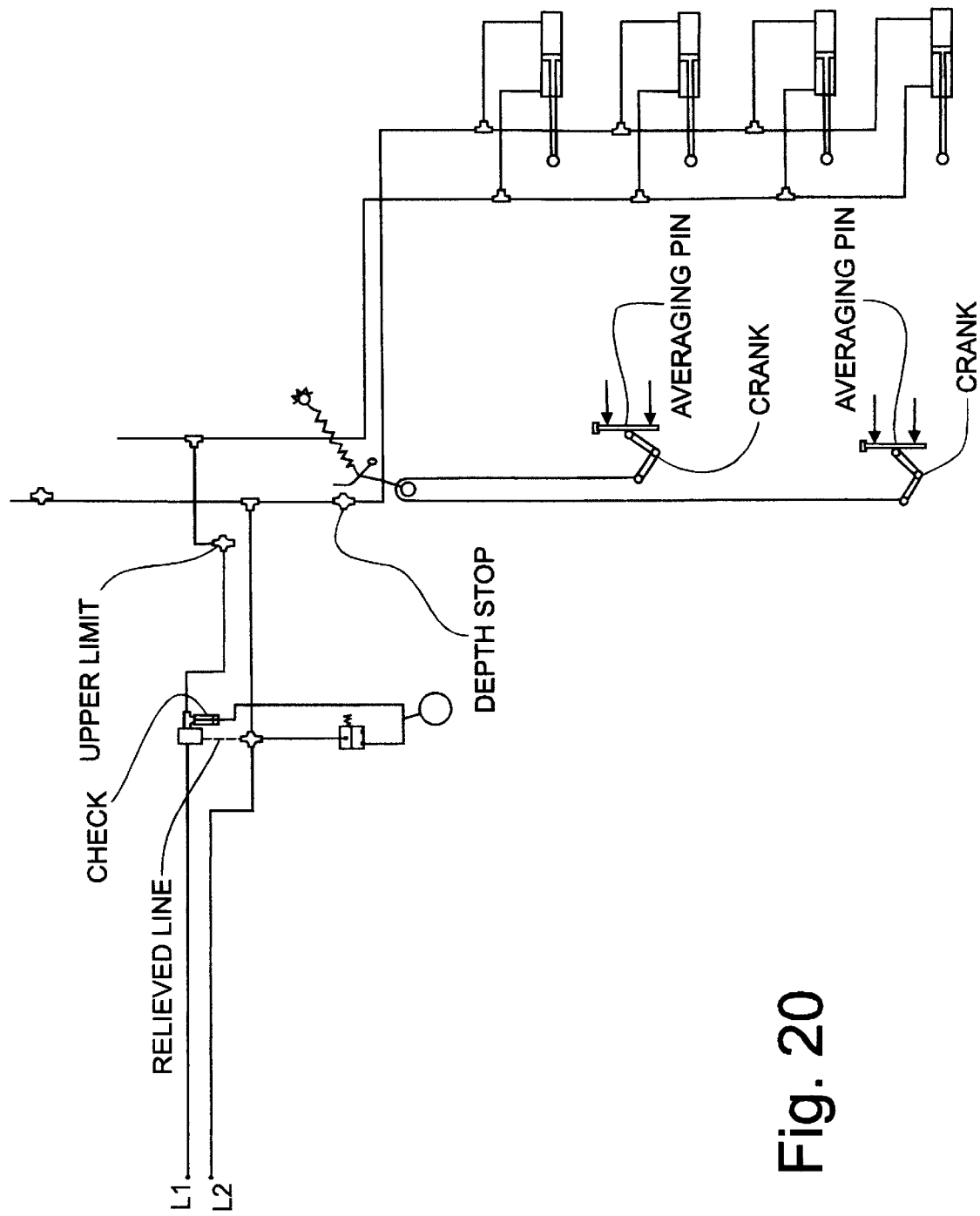
FIG. 20 a hydraulic schematic showing a depth control hydraulic circuit with a depth averaging link illustrated and superimposed on the schematic.

The implement shown in FIG. 13 includes wing wheel assemblies 1' for supporting the drawbar wing sections as described above. The wing wheel assembly 1' is shown in greater detail in FIG. 18. A wing wheel assembly is attached near the distal end of each wing section 20a, 20b, 20d, and 20e. The assembly has a main strut 6 which is attached to a wing drawbar section by a journal arrangement having a steering axis 10. A lockable caster arm 5 is pivotally supported by the strut 6 and, when not locked, provides caster motion to the wheel assembly. Wheels 2 and 3 are pivotally supported on parallel axles having axes 2a and 3a, the axles being attached to a walking beam axle having walking axis 4, with axes 2a and 3a being offset an equal distance from the walking axis 4.

A lock member 14 is pivotally supported by a bolt running through journal 16 and is free to pivot by the force of gravity. The lock 4 is adapted to fit within a locking saddle 15 which is fixed to the strut 6, and when engaged in the saddle 15, prevents rotation of the caster arm 5 about axis 7. The wing wheel assembly is pivotally controlled by a wheel steering actuator 11, connected at one end 13 to the strut 6, and at the other end to the drawbar wing. Extension and retraction of the wheel steering actuator 11 effects rotation of the wing wheel assembly 1' about the steering axis 10. The caster axis 7 is generally vertical when the drawbar 20 is rotated within a range of field positions, which is a range including a working position and a headland position, although it may be somewhat inclined forward or rearward.

The walking beam arrangement accommodates various positions of the caster axis while maintaining both wheels of the assembly on the ground so the height of the drawbar remains generally constant as the caster rotates and so that the load is evenly distributed. As the drawbar 20 is rotated upward to a transport position, the caster axis 7 becomes generally horizontal and lock 14 is pivoted by gravitational force to rest against saddle 5. If it does not immediately engage in the saddle, then it will soon become engaged during folding of the drawbar wings or as transporting of the implement begins to restrict rotation about axis 7 and provide stability to the wheel assembly during transport.

The wing wheel assemblies 1' of the drawbar wing sections are steered into alignment for either transport of field operation. The movement of a wing wheel assemblies 1' is controlled by an actuator 11 which is connected to a common circuit wing fold circuit 400 in parallel hydraulic connection with wing fold actuators 403 (not shown) that are connected between the drawbar center section and inner wing section. The number of hydraulic circuits requiring connection to the pulling vehicle is thereby minimized by having such a combination circuit. The wing wheel actuator 11 operation is sequenced by a hydraulic valve 405 so the wheel assembly 1' is steered at the appropriate moment during the folding and unfolding of the implement wing sections.

Folding Sequence

Figure 4:
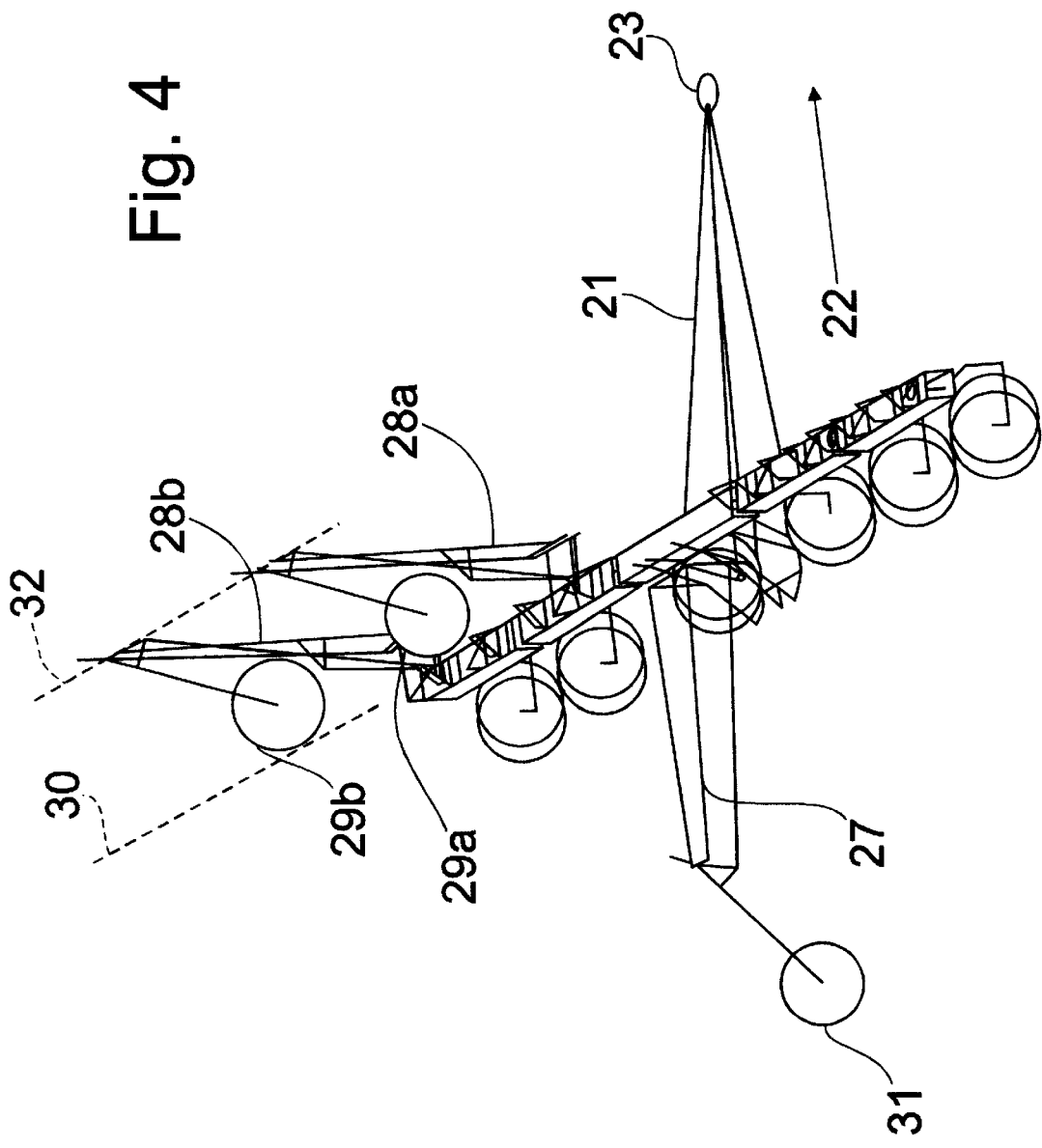
FIG. 4 is a perspective view showing subframes rotated to a generally vertical transport position.

1. To configure the implement for transport from a field position, the subframes are raised and the drawbar wings are folded. The wing wheel assemblies are steered in sequence as the drawbar wings are folded. The sequence begins by first setting the drawbar lock handle 52 to a locking position so that locks 48 are ready to engage hooks 47. This sets the headland link 331 to bypass the headland stop valve 330.
2. Hydraulic pressure is then applied to line 302 to cause subframe actuators 36 to extend and fully rotate the drawbar 20 until it is locked with the hitch section 21, restricting its rotation.
3. Hydraulic pressure is then applied to line 301 to cause subframe actuators 36 to retract. With the drawbar 20 locked, the subframes 28 are raised off the ground to a generally upright transport position as shown in FIG. 12 and FIG. 4.
4. Now pressure is applied to line 401 of the hydraulic fold circuit 400. This first causes a draft arm lock actuator 406 to retract to unlock draft arm locks, releasing draft arms which otherwise support the drawbar wing sections during field operation. After this is complete, the pressure increases to extend the wing fold actuators 403, folding the drawbar wing sections rearwardly.
5. As a drawbar wing section is nearly completely folded to a transport position as shown in FIG. 5, then a wheel actuator link (not shown), being responsive to the drawbar wing rotation, actuates the wheel actuator sequence valve 405 to allow hydraulic fluid to flow from the base end of wheel actuator 11 to the hydraulic reservoir (not shown). The actuator 11 is then retracted and the wing wheel assembly 1' is steered about 90 degrees about the now upright steering axis 10 to align the wheels in a direction suited for transport as the wings become completed folded back.

Unfolding Sequence

1. To unfold the implement to a field operating configuration the sequence is reversed. Pressure is first applied to line 402 to unfold the wings, but the pressure first causes the draft arm lock actuator 406 to extend and wheel actuators 11 to extend and the wing wheel assemblies 1' to be steered about 90 degrees to align the wheels about perpendicular to the transport direction. The draft arm locks (not shown) are now ready to engage with the ends of draft arms 46 so they become locked with the hitch section 21. They are spring biased to allow the locks some pivotal motion during engagement. When movement of the lock actuator 406 and wing wheel actuators 11 is complete, the pressure increases to cause the wing fold actuators 403 to retract and unfold the wings to a laterally aligned position.
2. Pressure is now applied to line 302 to cause subframe actuators 36 to extend and lower the subframes 28 to be generally parallel with the ground and so they are supported at their rearward ends by wheel assemblies 29 such that the weight of the drawbar is relieved from the locks 48 and the locks 48 can be disengaged from lock hooks 47.
3. Pressure is now applied to line 301 to cause the subframe actuators 36 to retract, rotating the drawbar 20 downward to a field operating position. At this time the caster lock 14 will fall out of engagement with saddle 15 to allow the castering motion about the now generally vertical axis 7.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In an agricultural implement having a hitch adapted for connection to a prime mover; a drawbar movably attached to said hitch for movement between a working position and a raised transport position, said drawbar having a pair of wings movable relative to one another; a plurality of subframes movably attached to said drawbar, said subframes being arranged in groups corresponding to said wings, each respective said subframe carrying ground engaging tools; a hydraulic actuator interconnecting said drawbar and each of said subframes to effect movement of each respective said subframe relative to said drawbar, the improvement comprising:

a hydraulic circuit including a pump, a reservoir, and hydraulic lines interconnecting said hydraulic actuators in parallel, said actuators being operable to raise said subframes from a working position to a transport position, said hydraulic circuit further including a depth stop valve for each respective group of actuators, said depth stop valves being operable when said subframes of the corresponding group reach said working position to close said hydraulic circuit for the subframes of the corresponding group such that said hydraulic actuators of the corresponding group remain in communication with each other without hydraulic fluid entering or leaving said corresponding group of actuators;

wherein the movement of said drawbar relative to said hitch actuates said depth stop valves when said subframes reach said working position.

2. The agricultural implement of claim 1 wherein said subframes are provided with a rearwardly positioned support wheel, each said subframe being vertically movable relative to the remaining subframes corresponding to said group of actuators to follow ground undulations.

3. The agricultural implement of claim 2 wherein the vertical movement of one of said actuators of said group displaces hydraulic fluid within said closed circuit, the displaced hydraulic fluid being distributed throughout said closed circuit such that the remaining actuators of said group are vertically moved in response to said distributed hydraulic fluid in a vertical direction opposite of said one actuator.

4. The agricultural implement of claim 1 wherein at least two of said subframes in each respective said group are connected to an averaging link which is operably associated with the corresponding said depth stop valve for actuation thereof according to an average depth of said connected subframes.

5. The agricultural implement of claim 4 wherein a central portion of said averaging link abuts a depth control crank which is connected to an adjustable stop member to engage said depth stop valve when the average position of said connected subframes reaches said predetermined working position.

6. The agricultural implement of claim 5 wherein hydraulic circuit circulates hydraulic fluid between said actuators and said reservoir when said depth control valve is not engaged so that said subframes can be moved to said raised transport position.

7. The agricultural implement of claim 6 wherein said hydraulic circuit further includes a headland stop valve that is cooperable with said drawbar to limit the movement of said drawbar from said working position toward said raised transport position to a headlands position in which said ground engaging tools have been raised above the ground so that said agricultural implement can be re-oriented before returning said ground engaging tools to said working position.

8. An agricultural implement for working the ground comprising:

a hitch adapted for connection to a prime mover;

a drawbar movably attached to said hitch for movement between a working position and a raised transport position;

a plurality of subframes movably attached to said drawbar, said subframes carrying ground engaging tools movable between a working position and a raised transport position relative to said drawbar, each said subframe having a hydraulic actuator connected to said drawbar to effect movement of each respective said subframes relative to said drawbar, said actuators being arranged in at least two groups;

a hydraulic circuit including a reservoir, a pump to provide a flow of hydraulic fluid under pressure to said hydraulic actuators, and hydraulic lines interconnecting said hydraulic actuators to said reservoir and said pump; and a depth control valve associated with each said group of actuators, each said depth control valve being operable to close said hydraulic circuit for the corresponding said group of hydraulic actuators, the hydraulic actuators in each group being connected in parallel in a circuit such that said hydraulic actuators remain in communication with each other when said circuit is closed;

wherein at least two of said subframes in each respective said group are connected to an averaging link which is operably associated with the corresponding said depth stop valve for actuation thereof according to an average depth of said connected subframes; and wherein a central portion of said averaging link abuts a depth control crank which is connected to an adjustable stop member to engage said depth stop valve when the average position of said connected subframes reaches said predetermined working position.

9. The agricultural implement of claim 8 wherein the vertical movement of one of said actuators of said group displaces hydraulic fluid within said closed circuit, the displaced hydraulic fluid being distributed throughout said closed circuit such that the remaining actuators of said group are vertically moved in response to said distributed hydraulic fluid in a vertical direction opposite of said one actuator.

10. The agricultural implement of claim 9 wherein said drawbar includes a pair of wings, said group of hydraulic actuators corresponding to one of said wings.

11. The agricultural implement of claim 8 wherein a central portion of said averaging link abuts a depth control crank which is connected to an adjustable stop member to engage said depth stop valve when the average position of said connected subframes reaches said predetermined working position.

12. The agricultural implement of claim 11 wherein said hydraulic circuit further includes a headland stop valve that is cooperable with said drawbar to limit the movement of said drawbar from said working position toward said raised transport position to a headlands position in which said ground engaging tools have been raised above the ground so that said agricultural implement can be re-oriented before returning said ground engaging tools to said working position.

13. An agricultural implement for working the ground comprising:

a hitch adapted for connection to a prime mover;

a drawbar movably attached to said hitch for movement between a working position and a raised transport position;

a plurality of subframes movable attached to said drawbar, said subframes carrying ground engaging tools movable between a working position and a raised transport position relative to said drawbar, each said subframe having a hydraulic actuator connected to said drawbar to effect movement of each respective said subframes relative to said drawbar, said actuators being arranged in one or more groups;

a hydraulic circuit including a reservoir, a pump to provide a flow of hydraulic fluid under pressure to said hydraulic actuators, and hydraulic lines interconnecting said hydraulic actuators to said reservoir and said pump, said hydraulic circuit further including a depth control valve associated with each said group of actuators, each said depth control valve being operable to close said hydraulic circuit for the corresponding said group of hydraulic actuators; and an averaging linkage interconnecting at least two of said subframes in each respective group to define an average depth with respect to said interconnected subframes, said averaging linkage being cooperable with the corresponding said depth stop valve for actuation thereof when said average depth corresponds to said working position for said subframes.

14. The agricultural implement of claim 13 wherein a central portion of said averaging link abuts a depth control crank which is connected to an adjustable stop member to engage said depth stop valve when the average position of said connected subframes reaches said predetermined working position.

15. The agricultural implement of claim 14 wherein the hydraulic actuators in each group being connected in parallel such that said hydraulic actuators remain in communication with each other when said circuit is closed.

16. The agricultural implement of claim 15 wherein the vertical movement of one of said hydraulic actuators in each respective group displaces hydraulic fluid within the closed hydraulic circuit corresponding to said respective group, the displaced hydraulic fluid being distributed throughout said closed hydraulic circuit so that the remaining hydraulic actuators of said respective group are vertically moved in response to said distributed hydraulic fluid in a vertical direction opposite of said one hydraulic actuator.

* * * * *